United States Patent [19]
Rödel et al.

[11] Patent Number: 5,594,547
[45] Date of Patent: Jan. 14, 1997

[54] MULTIELEMENT ATOMIC ABSORPTION SPECTROMETER AND MEASUREMENT METHOD USING SUCH AN ATOMIC ABSORPTION SPECTROMETER

[75] Inventors: Günther Rödel, Owingen; Bernhard Radziuk, Frickingen; Michael Zeiher, Owingen; Herbert Stenz, Ueberlingen, all of Germany

[73] Assignee: Bodenseewerk Perkin-Elmer GmbH, Uberlingen, Germany

[21] Appl. No.: 404,017

[22] Filed: Mar. 14, 1995

[30] Foreign Application Priority Data

Apr. 15, 1994 [DE] Germany .......................... 44 13 096.1

[51] Int. Cl.⁶ .............................. G01J 3/30; G01N 21/74
[52] U.S. Cl. ............................................. 356/312
[58] Field of Search ................... 356/311–312, 315–316, 356/307, 319, 326–329, 330–334

[56] References Cited

U.S. PATENT DOCUMENTS

| | | |
|---|---|---|
| 2,741,691 | 4/1956 | Lee . |
| 4,049,353 | 9/1977 | Missio . |
| 4,300,833 | 11/1981 | Harnly et al. ............... 356/312 X |
| 4,341,470 | 7/1982 | Parker et al. ................. 356/307 |
| 5,018,856 | 5/1991 | Harnly et al. ............... 356/328 X |
| 5,035,505 | 7/1991 | Tsukada et al. ............. 356/319 |
| 5,087,123 | 2/1992 | Gerlacher et al. ........... 356/328 X |
| 5,116,123 | 5/1992 | Kuderer . |
| 5,135,305 | 8/1992 | Fitz-Patrick ............... 356/312 X |
| 5,181,077 | 1/1993 | Dencks et al. ............... 356/312 X |
| 5,235,402 | 8/1993 | Prytherch ..................... 356/326 |
| 5,283,624 | 2/1994 | Tsukada et al. ............. 356/328 X |
| 5,412,468 | 5/1995 | Lundberg ..................... 356/326 |

FOREIGN PATENT DOCUMENTS

0332211A2 3/1989 European Pat. Off. .
0411481A2 7/1990 European Pat. Off. .
0423736A2 10/1990 European Pat. Off. .

(List continued on next page.)

OTHER PUBLICATIONS

Patents Abstracts of Japan—Atomic Absorption Spectrophotometer, 3–63549(A) P–1211 Jun. 5, 1991 vol. 15/No. 220.
Patents Abstracts of Japan—Atomic Absorption Spectrophotometer, 1–295135 (A) P–1006, Feb. 14, 1990 vol. 14/No. 78.
Patents Abstracts of Japan—Sample Atomizer for Zeeman Atomic–Absorptiometer 58–10533(A)–P–189 Apr. 6, 1983, vol. 7/No. 82.

*Primary Examiner*—Vincent P. McGraw
*Assistant Examiner*—K. P. Hantis
*Attorney, Agent, or Firm*—Edwin T. Grimes

[57] ABSTRACT

The invention relates to a multielement atomic absorption spectrometer for simultaneously performing measurements for determining both one element and a plurality of elements under optimum conditions. The atomic absorption spectrometer comprises at least two lamps respectively emitting lines of at least one analyte element, a furnace heating the analyte sample into its atomized state, at least one optical dispersion element having an entrance slit arranged upstream thereof, detector elements, as well as means for passing radiation emanating from the lamps through the furnace, through the entrance slit and the dispersion element to the detector elements, and measuring means. The spectrometer is characterized in that there are provided replaceable optical reflection means which can selectively be moved into the optical path of the lamps in such a manner that the radiation emanating from one, two or a plurality of lamps can be passed through the furnace at the same time, that the dispersion element for producing a two-dimensional dispersion spectrum comprises an echelle grating and a dispersion prism, and that the detector elements are formed by semiconductor photodiodes arranged in one plane. The invention includes a measurement method for further increasing the accuracy of measurements regarding the measurement of one element and the simultaneous measurement of a plurality of elements.

28 Claims, 13 Drawing Sheets

FOREIGN PATENT DOCUMENTS

| | | |
|---|---|---|
| 3419800A1 | 12/1984 | Germany . |
| 3608468A1 | 9/1987 | Germany . |
| 3817739A1 | 12/1988 | Germany . |
| 3906930A1 | 9/1989 | Germany . |
| 3811922A1 | 10/1989 | Germany . |
| 3902390A1 | 10/1989 | Germany . |
| 3811446A1 | 10/1989 | Germany . |
| 3811923A1 | 10/1989 | Germany . |
| 4021159A1 | 1/1991 | Germany . |
| 3538780C2 | 3/1991 | Germany . |
| 4335592A1 | 5/1994 | Germany . |
| 0038139 | 2/1988 | Japan .................................. 356/311 |
| 1181163 | 2/1970 | United Kingdom . |
| 2141221 | 12/1984 | United Kingdom .................. 356/311 |
| 2272286 | 10/1993 | United Kingdom . |

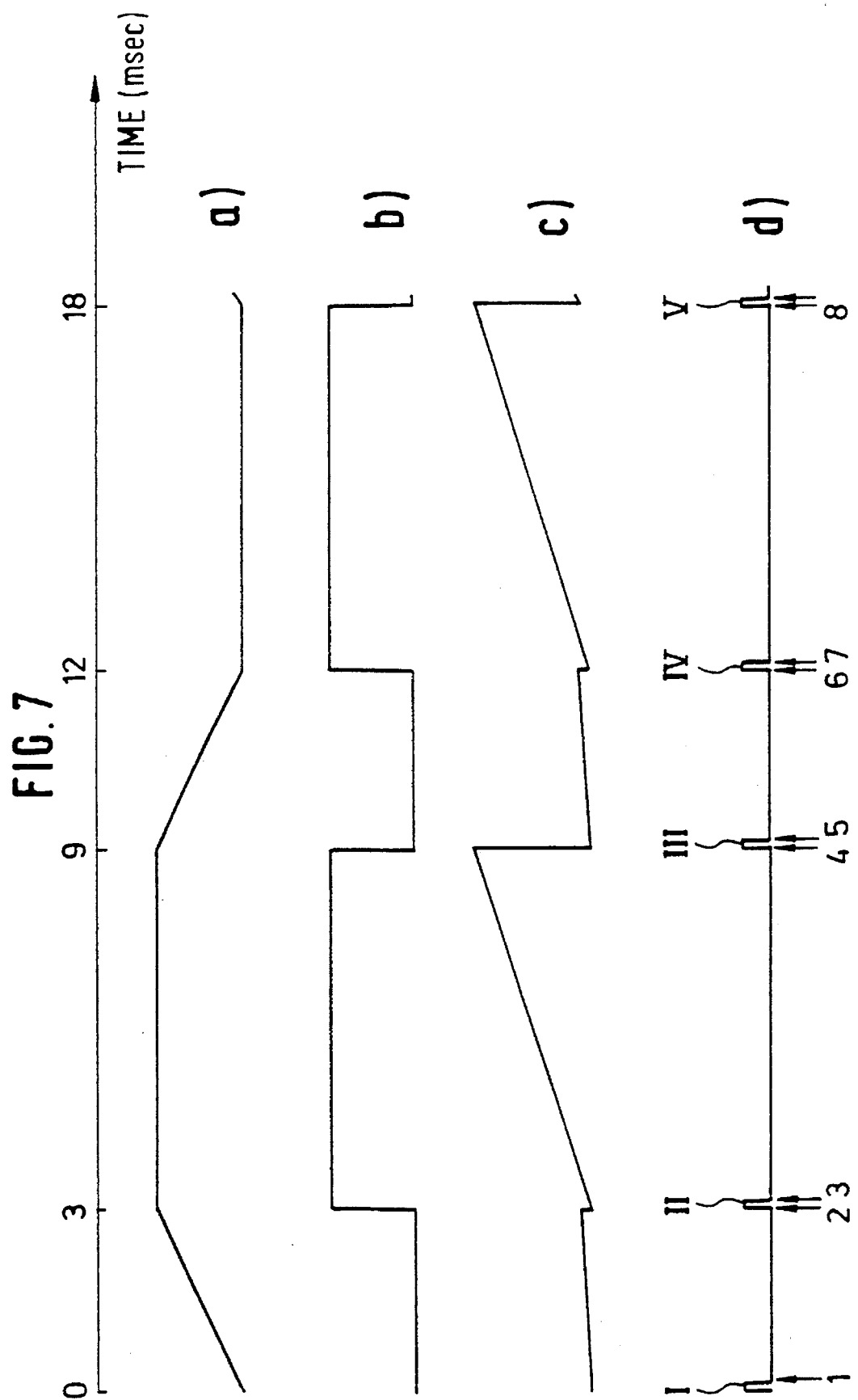

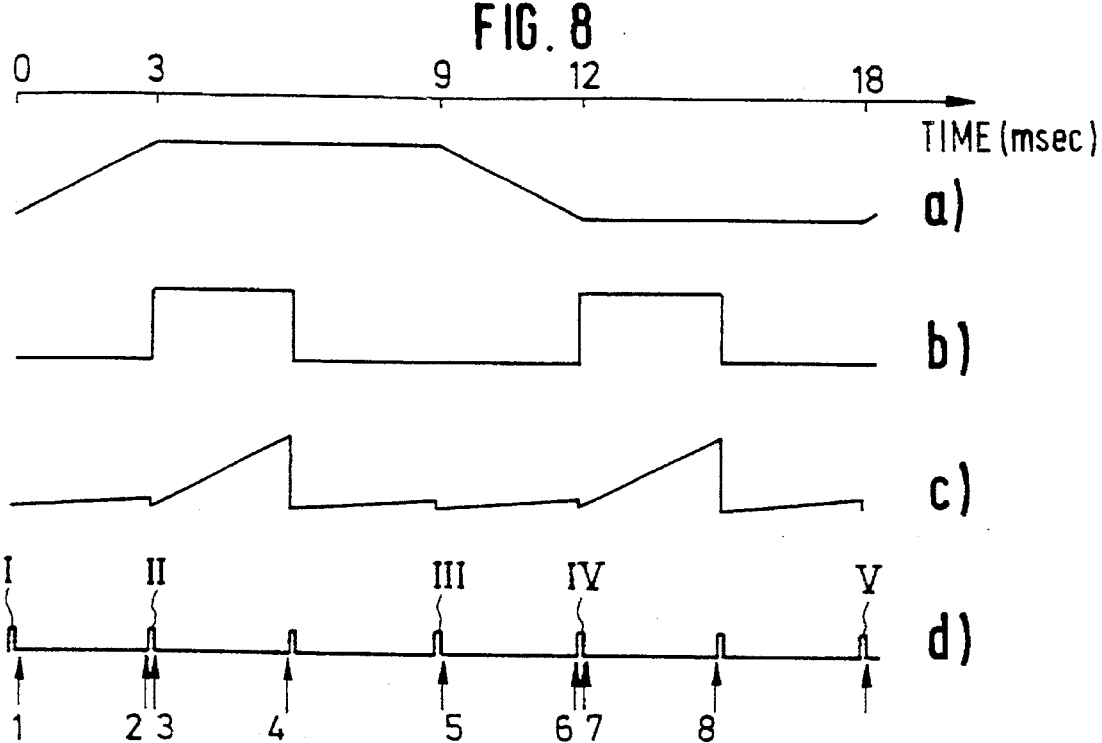
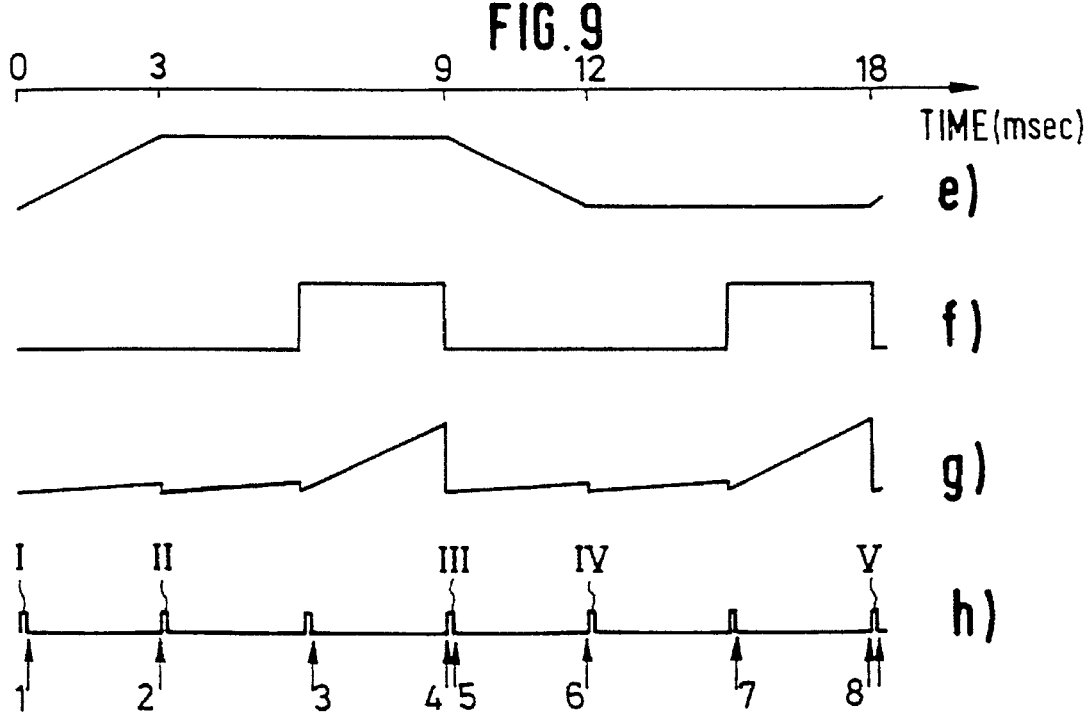

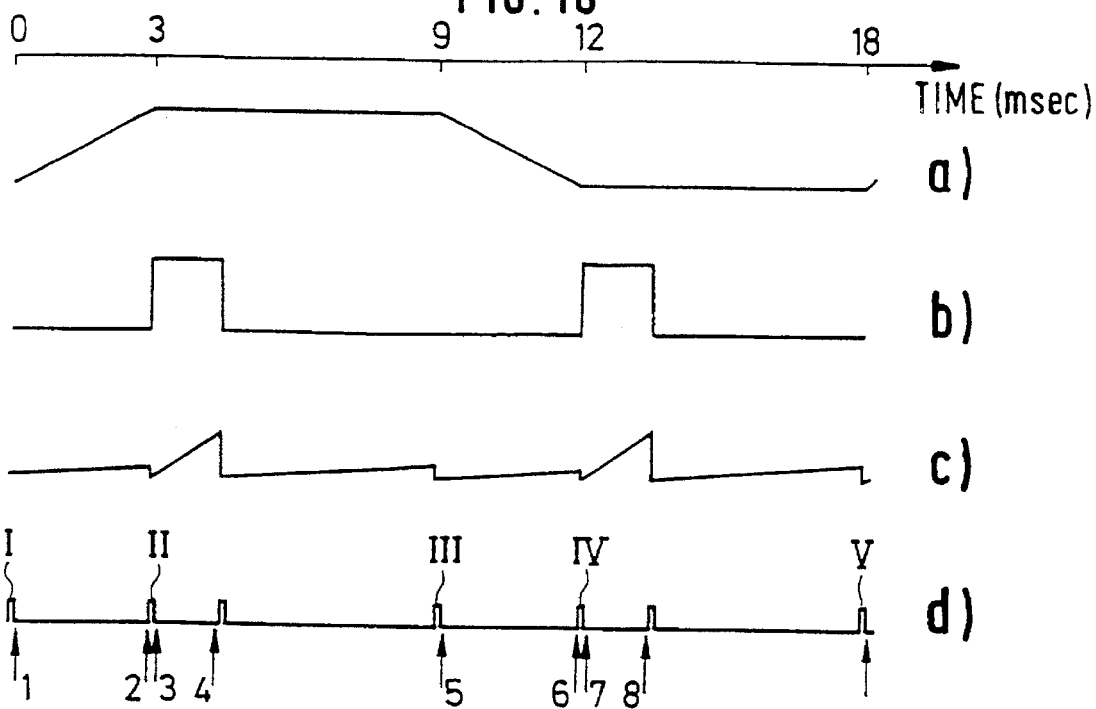
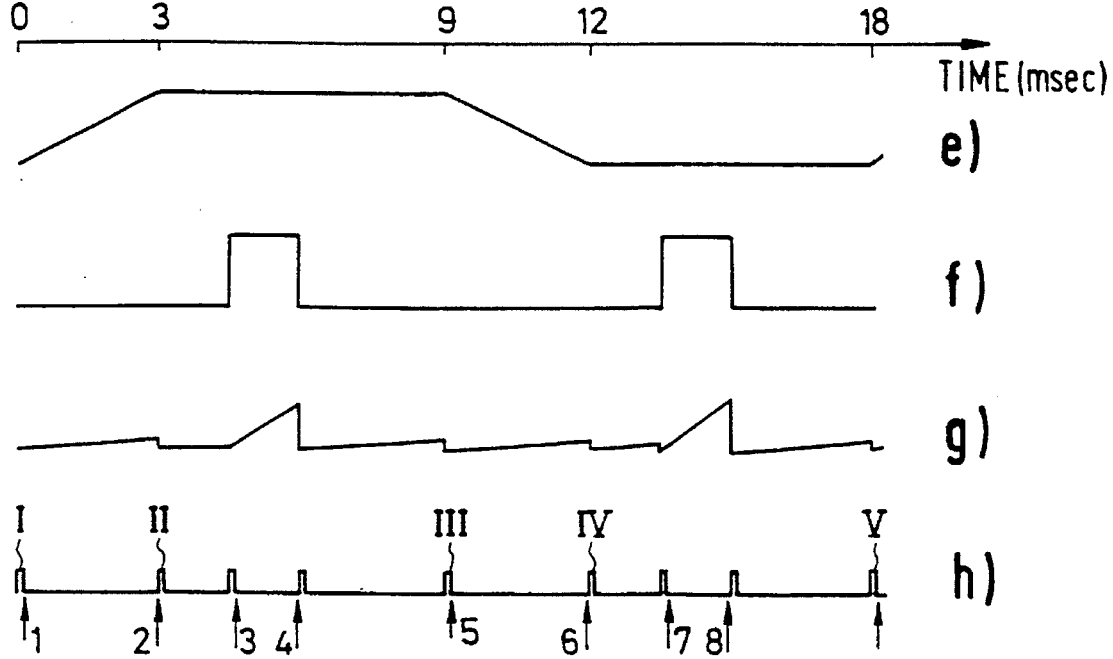

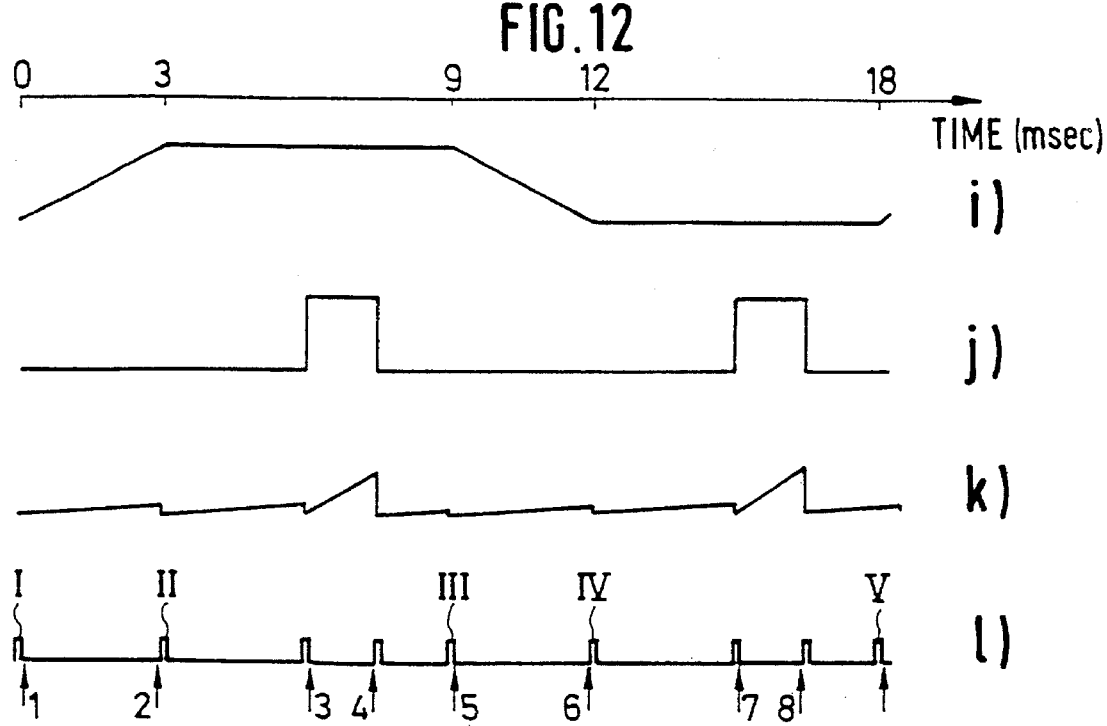
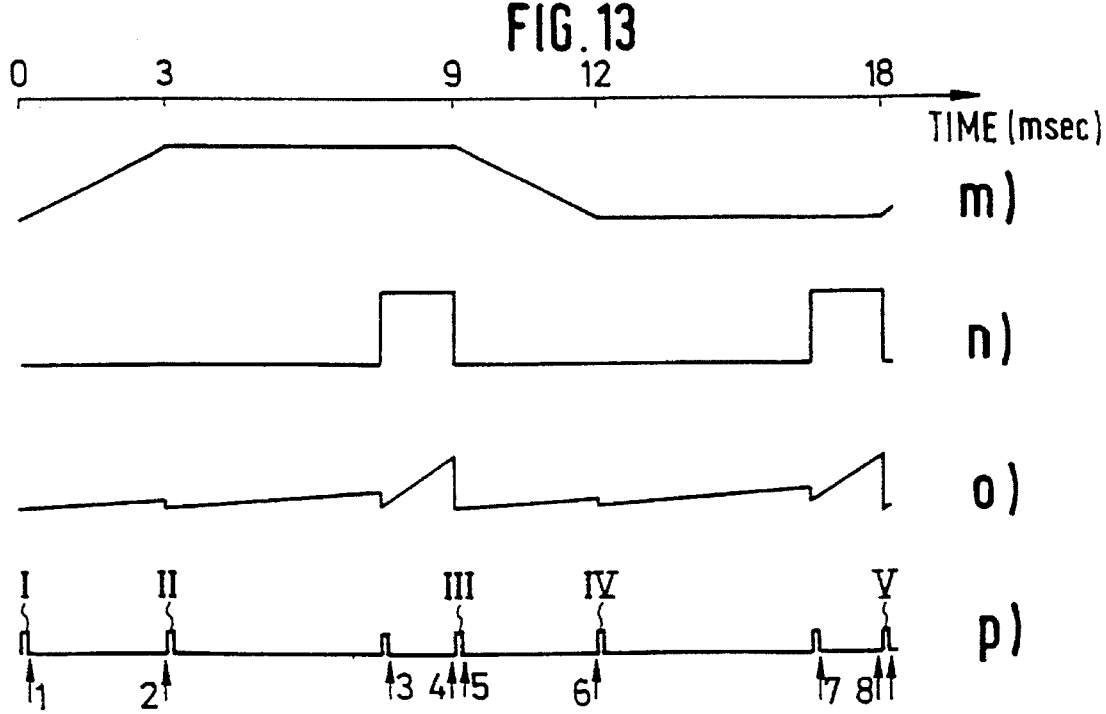

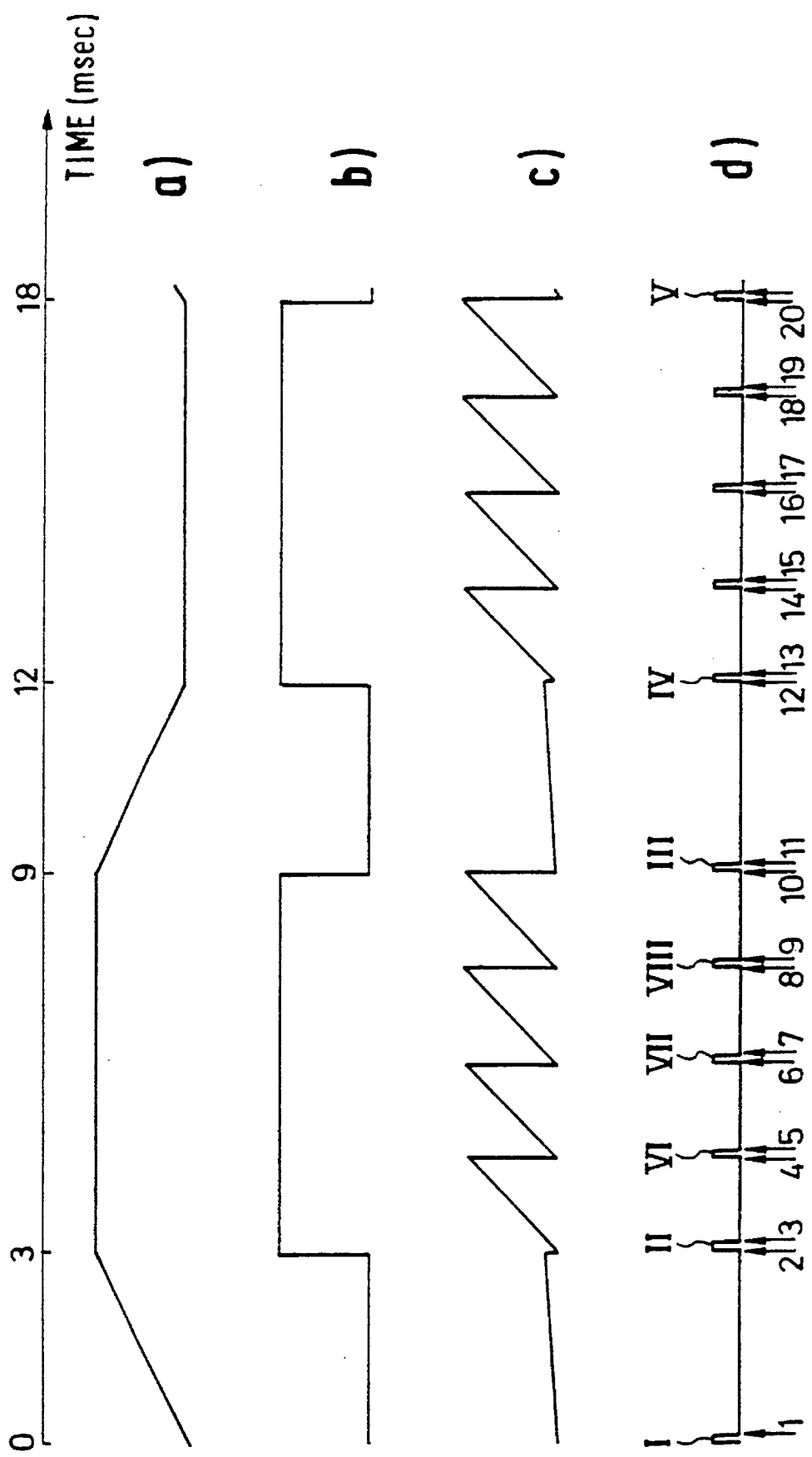

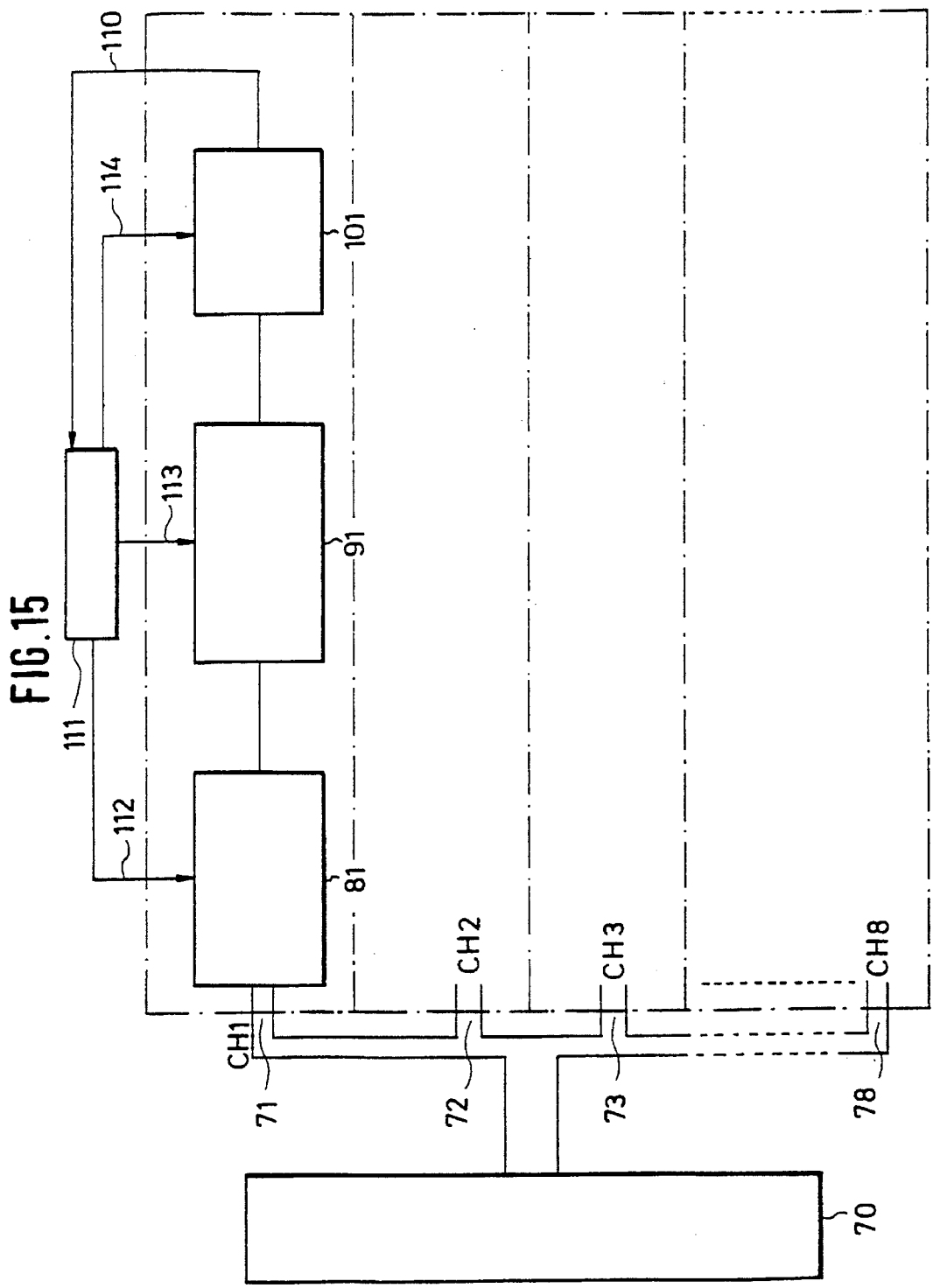

CHANNEL CH1
As 193.7 nm
As-LAMP TURNED OFF

CHANNEL CH2
Cd 228.802 nm

CHANNEL CH1
AS 193.7 nm

CHANNEL CH2
Cd 228.802 nm
As 228.812 nm SUPERIMPOSED

CHANNEL CH1
As 193.7 nm
LAMP PULSED

CHANNEL CH2
Cd 228.802 nm
As 228.812 nm SUPERIMPOSED
LAMPS PULSED

MULTIELEMENT ATOMIC ABSORPTION SPECTROMETER AND MEASUREMENT METHOD USING SUCH AN ATOMIC ABSORPTION SPECTROMETER

The present invention relates to a multielement atomic absorption spectrometer comprising at least two lamps respectively emitting lines of at least one analyte element, a furnace heating the analyte sample into its atomized state, at least one dispersion element having an entrance slit arranged upstream thereof, detector elements, and means for passing radiation emanating from the lamps through the furnace, the entrance slit and the dispersion element to the detector elements, as well as measuring means. The invention relates also to measurement methods using an atomic absorption spectrometer.

In conventional atomic absorption spectrometry (AAS), a line source is used with a monochromator of moderate resolution. The line source emits a spectrum which is characteristic of the analyte element. The spectral lines are generated at relatively low temperature and pressure, and so have line profiles with halfwidths of the order of less than 0.01 nm, which are considerably narrower than the absorption profiles of thermally volatilized atoms. In this case, the purpose of the monochromator is only to select a resonance line and to remove the continuum emitted by the atomizer. Thus high selectivity and sensitivity are achieved with relatively simple instrumentation.

Particularly high powers of detection can be achieved when atomic absorption spectrometry is combined with a semi-closed electrothermal atomizer. In this case, however, a correction for the attenuation of the atomic line by scattering and molecular absorption is essential. Correction based on the Zeeman effect has proven to be most effective.

A drawback of atomic absorption spectrometry, especially when used with the relatively time consuming electrothermal atomizing technique is the fact that only one element is determined during each measurement cycle. In the years since the introduction of the techniques, a number of attempts have been made to eliminate this disadvantage.

Simultaneous multielement atomic absorption spectrometers with both flame and electrothermal atomizers have been demonstrated using a continuum source. This requires the achievement of high resolution in order to maintain the selectivity of the atomic absorption spectrometer. Moreover, source intensity in the short UV wavelength range and source stability and lifetime are still unresolved problems.

The line spectra of several elements can be combined and detected separately in order to achieve multielement determination while maintaining the selectivity of an atomic absorption spectrometer. Several such approaches have been described.

Concave gratings have been used for the combination of several wavelengths by positioning light sources behind slits at the appropriate locations on the Rowland circle of a polychromator. A second concave grating polychromator with photomultipliers on the exit plane and a series of resonance cells with photomultipliers for detection of resonance fluorescene have been used to make atomic absorption spectrometer measurements with such an arrangement.

A two wavelength spectrometer employing mobile exit slits and photomultiplier detectors has been used with a multielement lamp as the atomic absorption spectrometer.

A series of beam splitters have been used to combine the beams from up to four line sources. As many as 9 sources have been combined using a "stack of mirrors". In such arrangements detection has been made by means of direct reading multiple slit spectrographs with individual photomultipliers situated behind the slits, or using a single photomultiplier with means to separate the radiation in time. Lundberg and Johansson (Anal. Chem. 48, 1922, (1976)) accomplished this by using a chopper wheel with slit combinations for a group of elements. Salin and Ingle (Appl. Spectrosc. 1978, 32, 579 (1978)) used time multiplexing of the line sources and collected the light exiting at several slits through a photon funnel at a single photomultiplier.

Systems for flame atomic absorption spectrometers have been described in which source beams were combined using fiber optics, passed through the atomizer, and separated either using a direct reading polychromator or by the combination of modulation at different frequencies, then guided to individual interference filters and detection at a single photomultiplier. The elements Ag and Cu, which have adjacent resonance lines, were determined simultaneously using two time multiplexed lamps and a single slit and photomultiplier.

The determination of three elements simultaneously using individually modulated cathodes of a single lamp in a non-dispersive system with a solar blind photomultiplier as detector has been described.

In a number of cases, either multielement lamps or the combined beams of more than one lamp were used with detection by means of a vidicon camera system at the focal plane of a monochromator. Attempts were already made to re-image the focal plane of a commercial echelle spectrometer in order to fit it within the sensitive area of a 2-dimensional vidicon camera.

In general, systems using multiple slits and/or filters with a single detector and those using vidicons suffer from the trade off between the wavelength range covered and spectral resolution. In addition, multiple slit systems are very inflexible and element combinations can be changed only with difficulty. Direct reading systems with sufficient channels to provide flexibility would be very complex and expensive. The 2-D echelle vidicon system provides, in principle, relatively broad wavelength coverage, but adaptation of the spectrometer to the camera results in complexity and poor throughput.

In all the above mentioned systems, either little attention was paid to background correction or correction was performed using either neighboring, non-resonance lines or a continuum source at the cost of a measurement channel.

A quasi simultaneously working atomic absorption spectrometer has become known in which the beam of one of several line sources and the wavelength measured at the exit slit are selected rapidly by means of a galvanometrically driven mirror and grating, respectively. This system suffers, when used for the measurement of the transient signals produced within an electrothermally heated furnace, from the disadvantages of limited temporal resolution and relatively long dead times during scanning, which negatively affects the signal to noise ratio.

EP-A-0 423 736 already discloses a multielement atomic absorption spectrometer which combines many of the attributes required for the multielement atomic absorption spectrometer having electrothermal heating. In this arrangement the beams from four line sources are combined, using four focussing mirrors, at a point located within a cylindrical graphite furnace for atomizing the sample. A constant magnetic field is applied to the furnace. The magnetic field, combined with rotating polarizers, makes possible background correction using the Zeeman effect. The mesurement beam is split and passed through four conventional grating monochromators, the parameters for which (slit, photomultiplier and grating characteristics) can be selected according to the element contained in the lamp at the corresponding location. The lamps are further modulated at different frequencies in order to separate potentional overlaps. The main disadvantages of the system are the complexity of the optical system and the inferior light throughput as compared to a single channel system based on the same monochromator. Moreover, the measurements of volatile and refractory elements simultaneously results in severe compromises in sensitivity.

It has been demonstrated that a furnace combining transverse heating and the use of an integrated platform simplifies the simultaneous determination of a wide range of elements and reduces the compromises which have to be accepted in simultaneously measuring several elements, as compared to optimized single element analysis. A system has been described in which the beams of several line sources were combined using beam splitters and passed through such a furnace to the entrance slit of an echelle spectrometer. Optical fibers located at the focal plane were here connected to individual photomultipliers. As with the direct reading systems, either a large number of photomultipliers were required or change of wavelengths was extremely cumbersome. Moreover, the light throughput, limited by the diameter of the fibers, was very low, making the system of value only for the development of analytical methods.

DE-38 11 922 already discloses an atomic emission spectrometer for the multielement determination of elements in a sample, wherein radiation emanating from the atomizing device is passed via an optical dispersion element consisting of an echelle grating and a dispersion prism, and is imaged within an area as a two-dimensional line spectrum. Semiconductor photodetectors which are connected to an evaluation circuit are arranged in the focal plane.

With analyses that are performed with the aid of the atomic absorption spectrometry, the respectively optimum device and analysis parameters generally vary greatly from element to element. When several elements are simultaneously determined side by side (simultaneous multielement analysis), this has so far had the disadvantage that compromise values which partly differ greatly from the values that would be optimum for the individual elements must be chosen for the parameters. It is therefore an object of the present invention to provide a simultaneous multielement atomic absorption spectrometer which avoids said disadvantage as much as possible and permits the processing of each element substantially with optimum parameters even in cases where several elements are simultaneously determined. In particular, a simultaneous multielement atomic absorption spectrometer is aimed at which during operation can be adapted to the type and number of the elements to be determined side by side, so that in an extreme case the same qualitative result is achieved in the determination of an individual element as in a classical single-element atomic absorption spectrometer.

Furthermore, a simultaneous multielement atomic absorption spectrometer which offers an optimum signal to noise ratio for each function, but simultaneously maintains specifity and selectivity of atomic absorption spectrometry is desired, especially because of the above mentioned fundamental drawbacks of a multielement atomic absorption spectrometer as compared with a single-element device.

In accordance with the invention a multielement atomic absorption spectrometer of the above mentioned kind is provided which is characterized in that there are provided replaceable optical reflection means which can selectively be moved into the optical path of the lamps in such a manner that the radiation emanating from one, two or several lamps can be passed through the furnace at the same time, that the dispersion element for producing a two-dimension dispersion spectrum comprises an echelle grating and a dispersion prism, and that the detector elements are formed by semiconductor photodiodes arranged in one plane.

It is possible through the present arrangement to perform any desired single-element and multielement measurements with the same apparatus.

Further developments of the invention will become apparent from the subclaims which are explicitly included in the description.

The invention relates to a measurement method using an atomic absorption spectrometer of the above-mentioned type wherein a means is provided for generating a magnetic field in the furnace and is characterized in that a magnetic field which rises, which is then kept constant, which abates and then becomes a constant zero magnetic field is produced on the sample cyclically during predetermined periods, that the lamp or lamps are respectively operated intermittently during the periods of a constant magnetic field, that the height of the entrance slit is adjusted such that the short wavelength lines do not overlap in the orders, that it is determined prior to a measurement whether spectral lines intended for the measurement of the analyte elements overlap and that in response to a situation where an overlap is absent or present the lamps are operated continuously or individually and in temporally separated fashion during the periods.

Such a procedure makes it possible to considerably increase the light throughput of the assembly and thus the intensity of each spectral line to be measured, whereby the power of detection (sensitivity) of each measurement is considerably improved also during the simultaneous measurement of several elements.

Further developments of the measurement method according to the invention are outlined in the subclaims which are incorporated into the description by reference thereto.

The invention shall now be explained in more detail with reference to preferred embodiments illustrated in the drawing, in which:

FIG. 7 shows the time sequence of a plurality of parameters during operation of one lamp or during simultaneous operation of a plurality of lamps;

FIGS. 8 and 9 are illustrations similar to the one in FIG. 7, in which two lamps are operated in pulsed fashion at different times;

FIGS. 10 to 13 are diagrams similar to the one in FIG. 7, illustrating the time sequence when four lamps are operated in temporally separated fashion in a pulsed mode.

FIG. 14 is an illustration similar to the one of FIG. 7, wherein the output signal of the charge amplifier is repeatedly sampled and reset during a measurement period;

FIG. 15 is a diagram of the reading and controlling circuit; and

FIG. 16(a)-(f) is a diagram illustrating the measurement for simultaneously determining the elements As and Cd.

Figure 1:
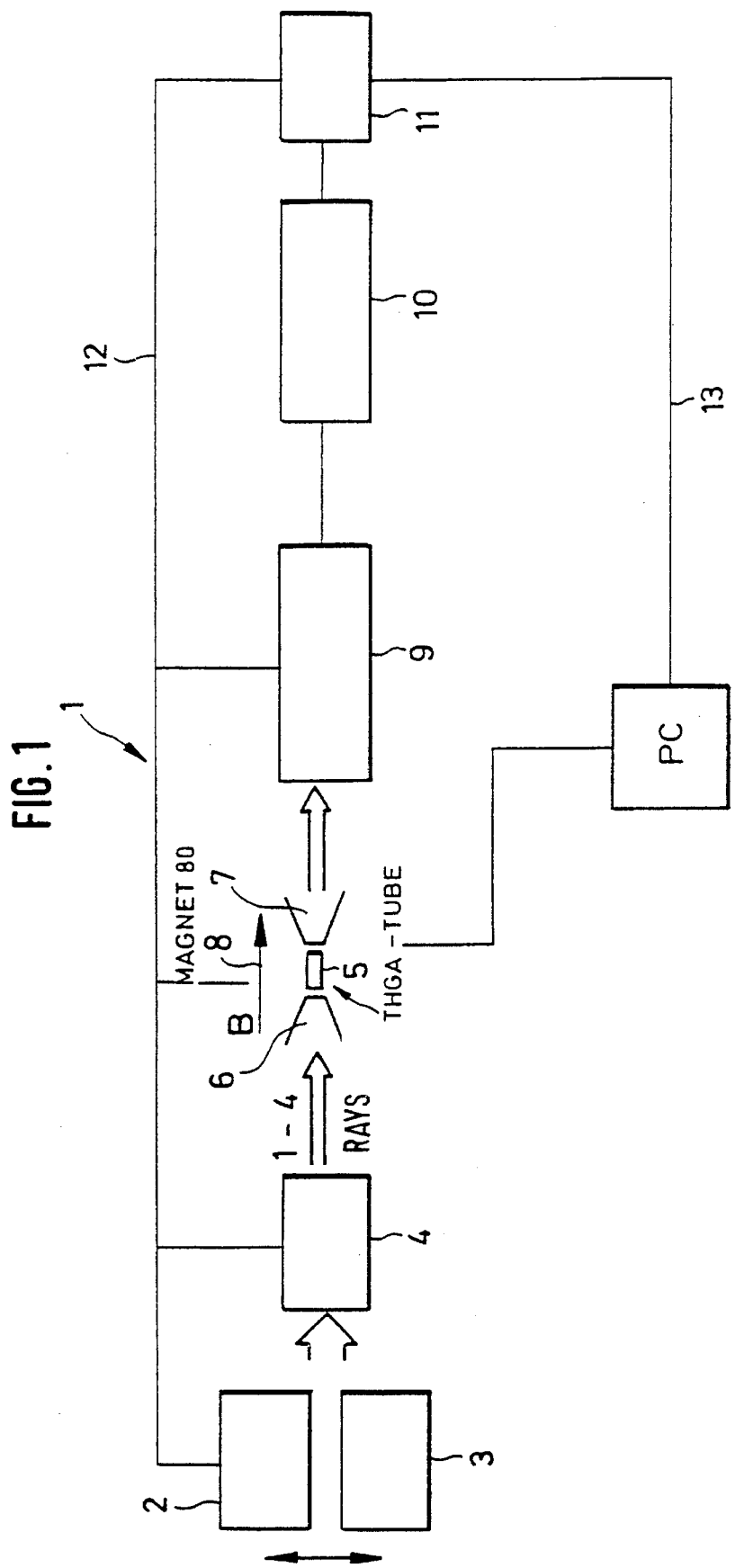
FIG. 1 is an overall diagram of an atomic absorption spectrometer constructed according to the invention.

FIG. 1 is an overall diagram of the atomic absorption spectrometer of the invention designated by 1. Two times four lamps are provided as sources, of which four lamps are jointly held in a first cassette 2 and four lamps in a second cassette 3. The cassettes may for instance be designed in the form of revolver-type magazines which may for instance be held to be rotatable about a predetermined axis. To move a respective cassette into an operative position, the two cassettes may, for instance, be retained in an elevator, or the cassettes may themselves be arranged in a common revolver-type magazine which respectively moves one of the two cassettes into the operative position by rotating about its axis. Each of the lamps contains one or several elements whose spectral lines are emitted by them during operation. One, two, three or four lamps at the most are at first to be operated simultaneously during a measuring operation. An arrangement in which the beams emanating from up to eight lamps can be combined simultaneously is certainly possible and also within the scope of the invention. This shall be described in more detail further below.

The beams from the lamps of a cassette in the operative position are combined by a beam combiner 4 to form a common optical path. The beams from one to four lamps are passed through a cylindrical opening of a furnace 5. The furnace is preferably constructed as a transversely heated graphite atomizer. A magnetic field 8 which extends in the longitudinal direction of the passageway of the furnace is produced on the furnace via diagrammatically illustrated pole shoes 6 and 7. The radiation emanating from the furnace is passed onto an echelle polychromator 9. The echelle polychromator produces a two-dimensional dispersion spectrum. A number of semiconductor photodetectors are arranged in an assembly 10 in the focal plane of the two-dimensional dispersion spectrum. The signals from the semiconductor photodetectors are supplied to a reading and controlling unit 11. Both the position of the cassettes and the position of the individual lamps in a cassette can be controlled from the controlling unit 11 via a line 12, the lamps being preferably provided with built-in codes in such a manner that each built-in lamp furnishes information to the controlling unit about the element or elements contained therein. Furthermore, the controlling means helps to control the operational parameters of the lamps, such as intensity and switch-on phase, the position of the beam combining device, the adjustment of the echelle polychromator and magnet 80 and thus the magnetic field 8 and the heating up of the furnace 5.

In the multielement atomic absorption spectrometers of the prior art in which an arrangement has been provided for the simultaneous measurement with four lamps, this means that the solid angle for each lamp has to be reduced to a quarter in comparison with an assembly in which only one lamp is used. As a consequence, the signal to noise ratio for each lamp also decreases to a quarter in comparison with an assembly comprising only one lamp. If one wishes to determine a single element with such an assembly using only one lamp, the assembly has the disadvantage that the signal to noise ratio is decreased by the factor ¼ in case of a measurement with one lamp. This disadvantage is now avoided according to the invention by using an assembly as shown in FIGS. 2 and 3.

Figure 2:
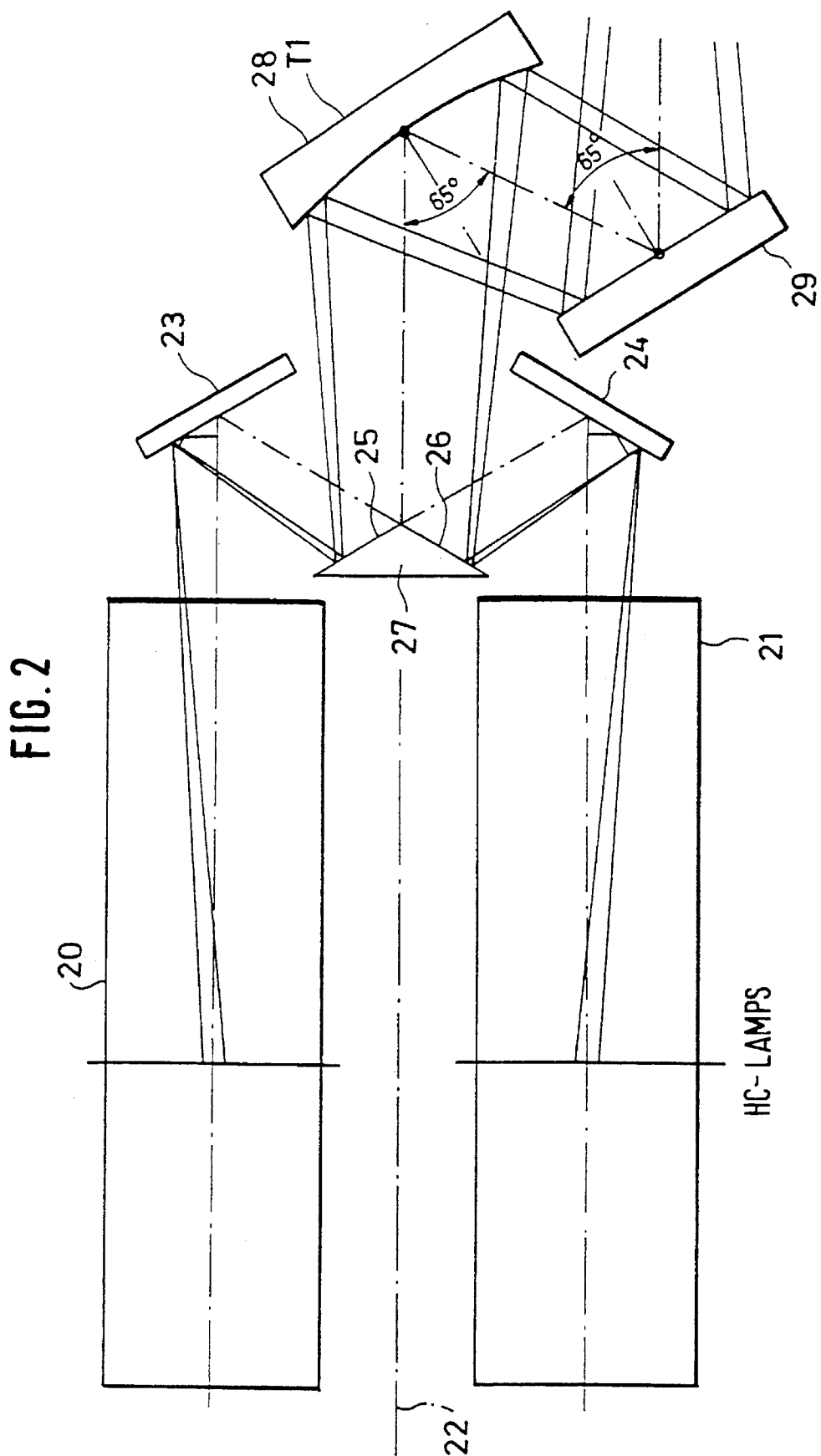
FIG. 2 is a diagram of an assembly designed in accordance with the invention for combining the beams from two lamps, a third lamp positioned below the plane of drawing and a fourth lamp positioned above the plane of drawing being not illustrated in the drawing.

FIG. 2 illustrates two lamps 20, 21 which are held in a cassette 2 and a cassette 3 respectively (not shown in more detail). Apart from the illustrated lamps the cassette holds thereon two additional lamps of which one is arranged below the plane of drawing and another one above the plane of drawing approximately in such a manner that all lamps are positioned with their axes at the corners of a square. The cassette is preferably held such that it is rotatable approximately about axis 22. The axis is preferably arranged such that all lamps are positioned with their longitudinal axes in parallel with said axis and at the same distance therefrom. The radiation emanating from lamps 20 and 21 impinges on a plane mirror 23 and 24, respectively, from which the radiation is respectively passed to a side 25 and 26, respectively, of a four-edged prism 27. The beams from the two lamps that are not shown are passed in a similar way via corresponding plane mirrors to the two remaining sides of the four-edged prism 27. The four beams are directed onto the concave mirror 28 and impinge from there onto a plane mirror 29 which then passes the beam of rays through the furnace 5 in FIG. 1. A beam combiner as is designated by 4 in FIG. 1 is arranged in this manner when measurements are to be carried out with the radiation from four or three lamps.

Figure 3:
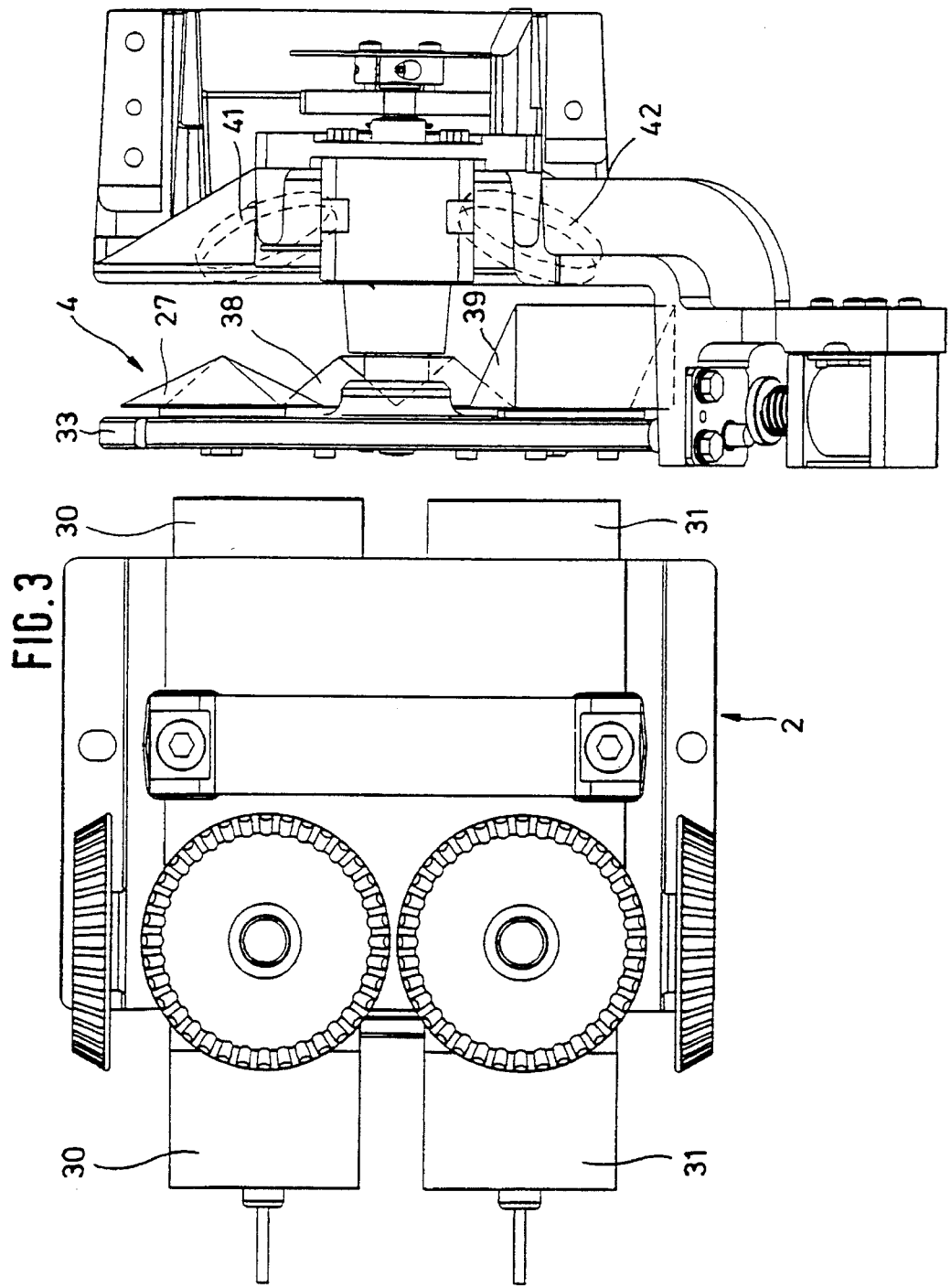
FIG. 3 is a diagram of an assembly for optionally using the radiation from one lamp alone or for combining the beams from two or four lamps with each other.

A beam combiner assembly 4 designed in accordance with the invention is shown in more detail in FIG. 3. First of all, a cassette 2 in which four lamps are held, of which only two lamps 30, 31 can be seen, while the two other lamps are covered by said lamps, can be seen at the left side of a cassette 2. The light exit ends of said lamps have arranged opposite thereto a disc 33 which is rotatable about an axis in parallel with the plane of drawing and relative to the longitudinal axes of lamps 30 and 31 and is provided with radiation passage openings. The disc has arranged, at the side facing away from the lamps, the four-edged prism 27, a roof prism 38, and a rectangular prism 39 in such a manner that these can each be brought by a rotation of disc 33 about the axis thereof into a position in which the four-edged prism 27 is located in FIG. 2. The design of the roof prism and of the rectangular prism is chosen such that these respectively receive the full impinging beam cross-section and expediently have the same base as the four-edged prism 27. FIG. 3 further illustrates two plane mirrors 41 and 42 which are assigned to the lamps covered by lamps 30 and 31. The mirrors assigned to lamps 30 and 31 are omitted in FIG. 3 for reasons of clarity.

In the position of disc 33 which is illustrated in FIG. 3, the roof prism 38 is in the operative position as follows from FIG. 2 for the four-edged prism 27. The roof prism 38 is used only when the radiation from two sources is to be combined while the rectangular prism serves the measurement with only one source.

As can easily be seen, the rectangular prism permits the exploitation of the full solid angle in case of a measurement with only one source, which is most of the time tantamount to the determination of one element (a source may, however, also comprise several elements), whereby conditions are created that can be compared with the measurement of a single element with a monochromator. When the roof prism is used, and measurement with two sources is performed, the available solid angle is just halved, so that the signal to noise ratio is altogether increased by a factor up to 4 in case of measurement with a rectangular prism, and by a factor 2 in case of the use of a roof prism, as compared with the measurement of a four-edged prism, i.e., the simultaneous measurement of at least four elements. This means that on account of the design of the beam combiner 4 according to the invention together with the atomic absorption spectrometer designed for the simultaneous measurement of several elements, it is also possible to perform a measurement of one element only with a light throughput that corresponds to the measurement of an individual element with monochromator. When, as already described, the cassettes are held such that they are held about an axis in parallel with the lamps, it is possible to arrange each individual lamp approximately opposite to the rectangular prism by rotation of the cassette when said prism is in its operative position. Each lamp can thus be used in an individual operation for determining a specific element.

As illustrated with reference to FIG. 1, there may be provided one or also several cassettes each with up to four lamps that are preferably only individually brought into an operative position. By contrast, an assembly is also possible wherein two cassettes with four respective lamps are simultaneously brought into an operative position by assigning a beam combiner with a roof prism to each cassette, and the beams from the two roof prisms are combined in a suitable manner and then jointly passed through the furnace.

Figure 4:
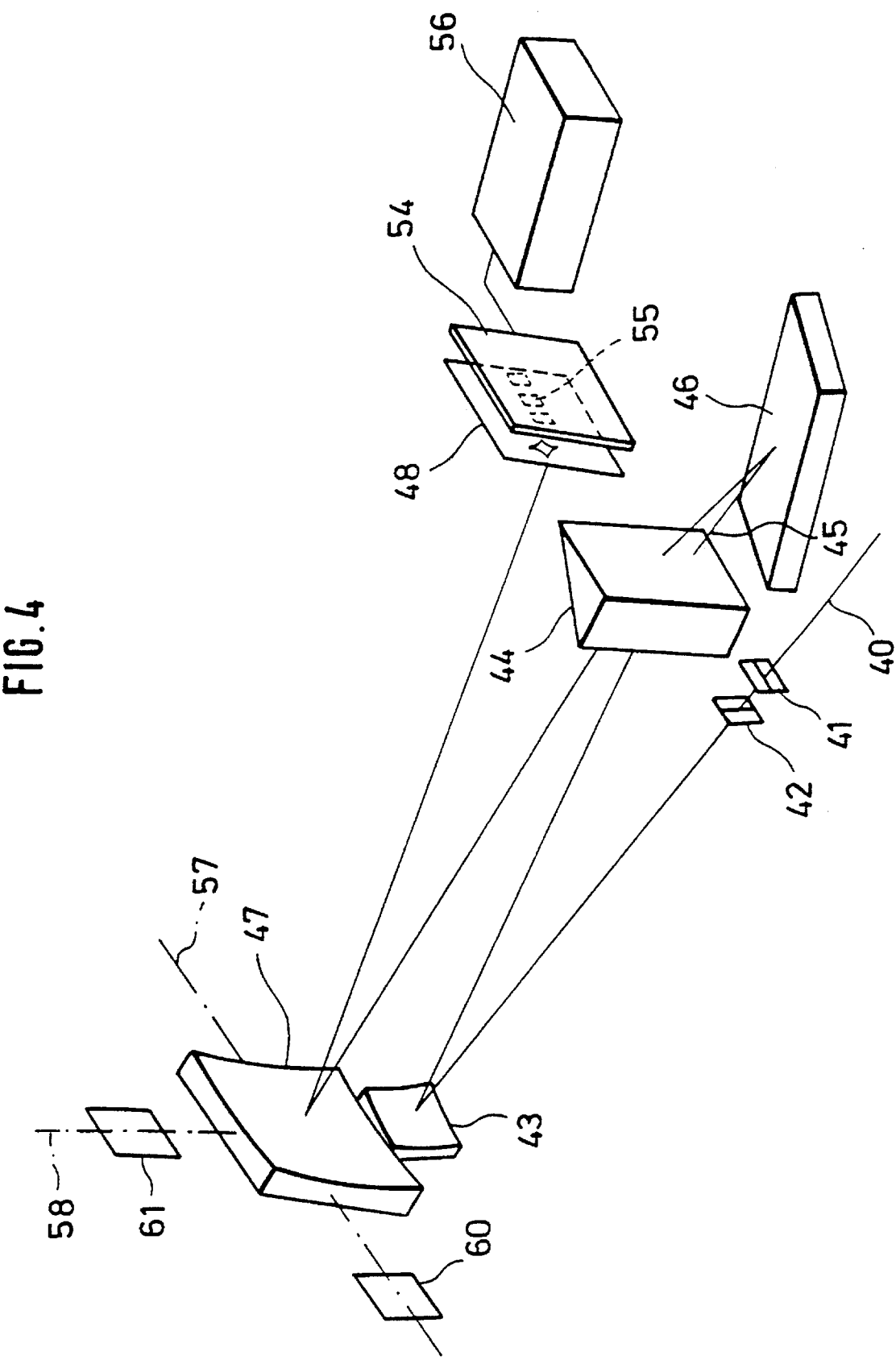
FIG. 4 is a diagram illustrating the structure of the atomic absorption spectrometer in the optical path downstream of the furnace.

FIG. 4 is a diagram of the optical path of the radiation 40 emanating from the furnace. The light beam 40 is defined by a main slit 41 which is horizontal in FIG. 4, and by a transverse slit 42 perpendicular thereto. The light beam 40 is then collimated by a collimating mirror 43 and passed through a dispersion prism 44. The light beam 45 which has been dispersed into a spectrum once by the dispersion prism 44 impinges under a great angle of incidence in very flat fashion onto an echelle grating 46. The echelle grating spectrally disperses the beam 22 by diffraction in a direction perpendicular to the one in which dispersion by the dispersion prism 44 took place, i.e., in a plane which is substantially perpendicular thereto in FIG. 4. The diffraction is of a high order. This effects a very strong spectral dispersion, but also a strong overlapping of the various orders. The diffracted light exits again through the dispersion prism 44 and is collected by a camera mirror 47 in a focal plane 48.

Figure 6:
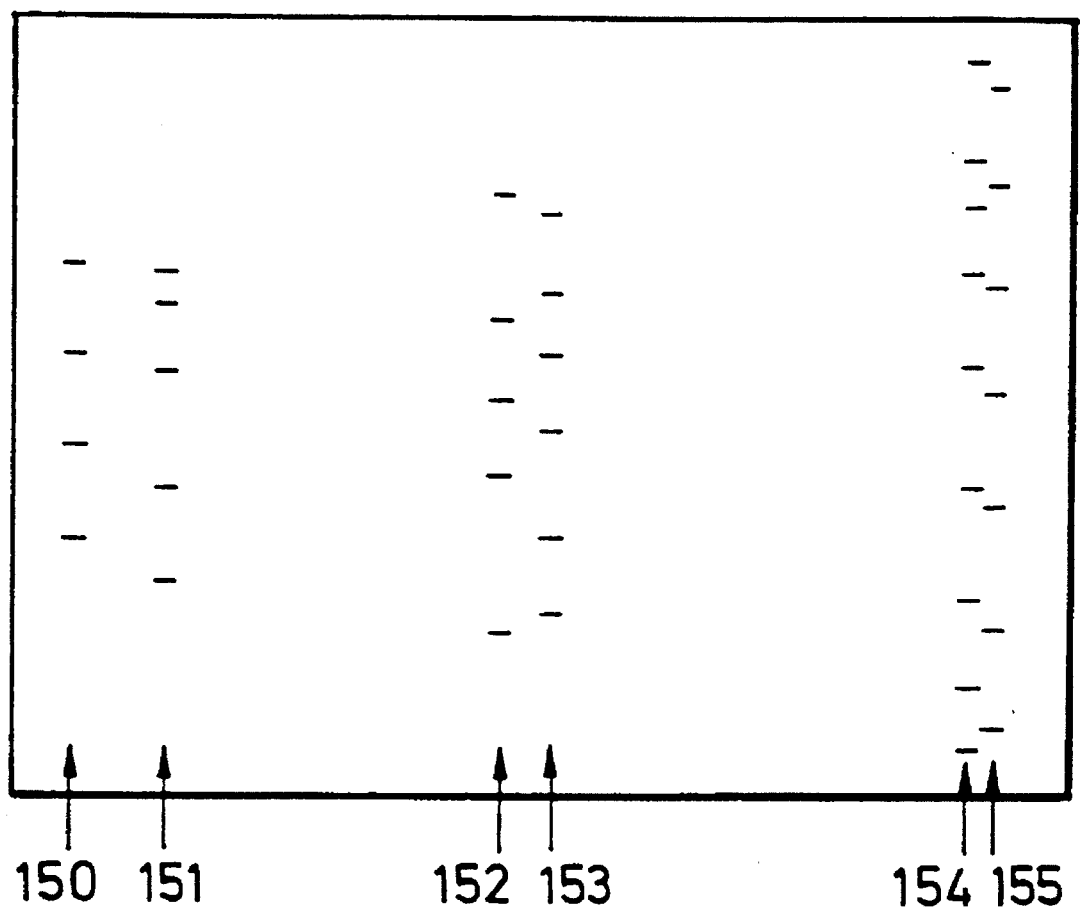
FIG. 6 is a diagram of the two-dimensional dispersion spectrum in the focal plane.
Figure 16A:
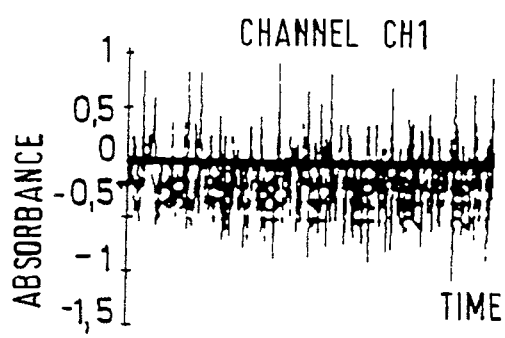
Figure 16B:
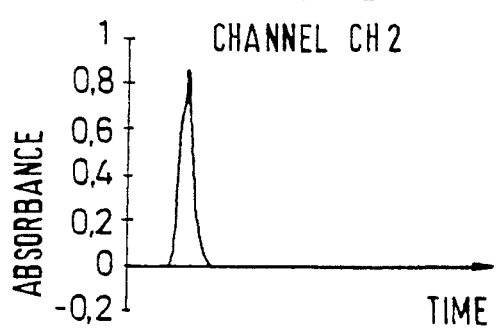
Figure 16C:
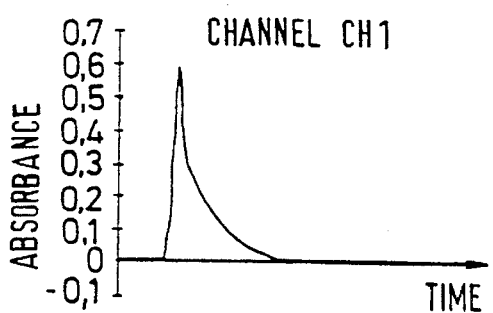
Figure 16D:
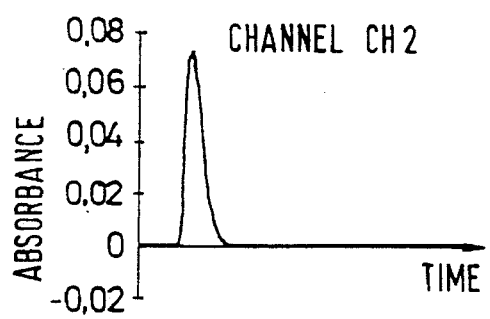
Figure 16E:
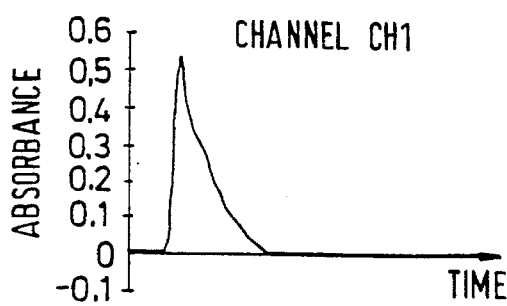
Figure 16F:
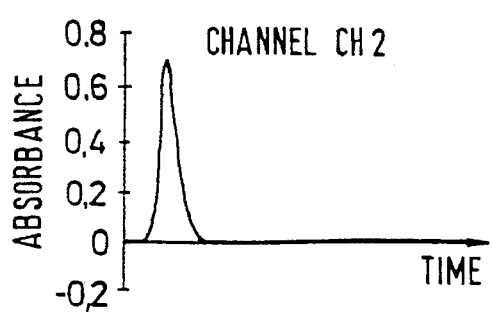

A spectrum of high resolution and with the lines of the individual elements for instance in the manner as shown in FIG. 6 and designated by 49 is created in the focal plane 48. The various orders of the echelle grating 46 are separated by the dispersion prism 44 and are positioned side by side in the spectrum. The individual lines are each located in the vertical columns 150 to 155. For reasons of clarity the other columns of lines which are positioned between columns 151 and 152 on the one hand and columns 153 and 154 on the other hand are not illustrated. The lines in columns 150, 151 approximately correspond to the wavelengths around 200 nm and approximately to the 100th order. The lines in columns 152, 153 correspond approximately to the wavelengths around 300 nm in the approximately 80th order; and the lines in columns 154, 155 correspond approximately to the wavelengths around 800 nm in approximately the 35th order.

The mutual distances of two spaced-apart columns 150–155 depend on the height of the entrance slit 41 in FIG. 4. When the height of said entrance slit is increased, the distances between the columns between the spectral lines of great wavelength, e.g approximately between columns 154 and 155, continuously decrease, and the spectral lines overlap more and more with an increasing entrance slit. By contrast, the distance between the columns of spectral lines in the short-wave range (for instance columns 150 and 151) changes at a relatively slow pace. In the illustration of FIG. 6, the height of the entrance slit is chosen such that columns 154 and 155 do just not overlap.

Figure 5:
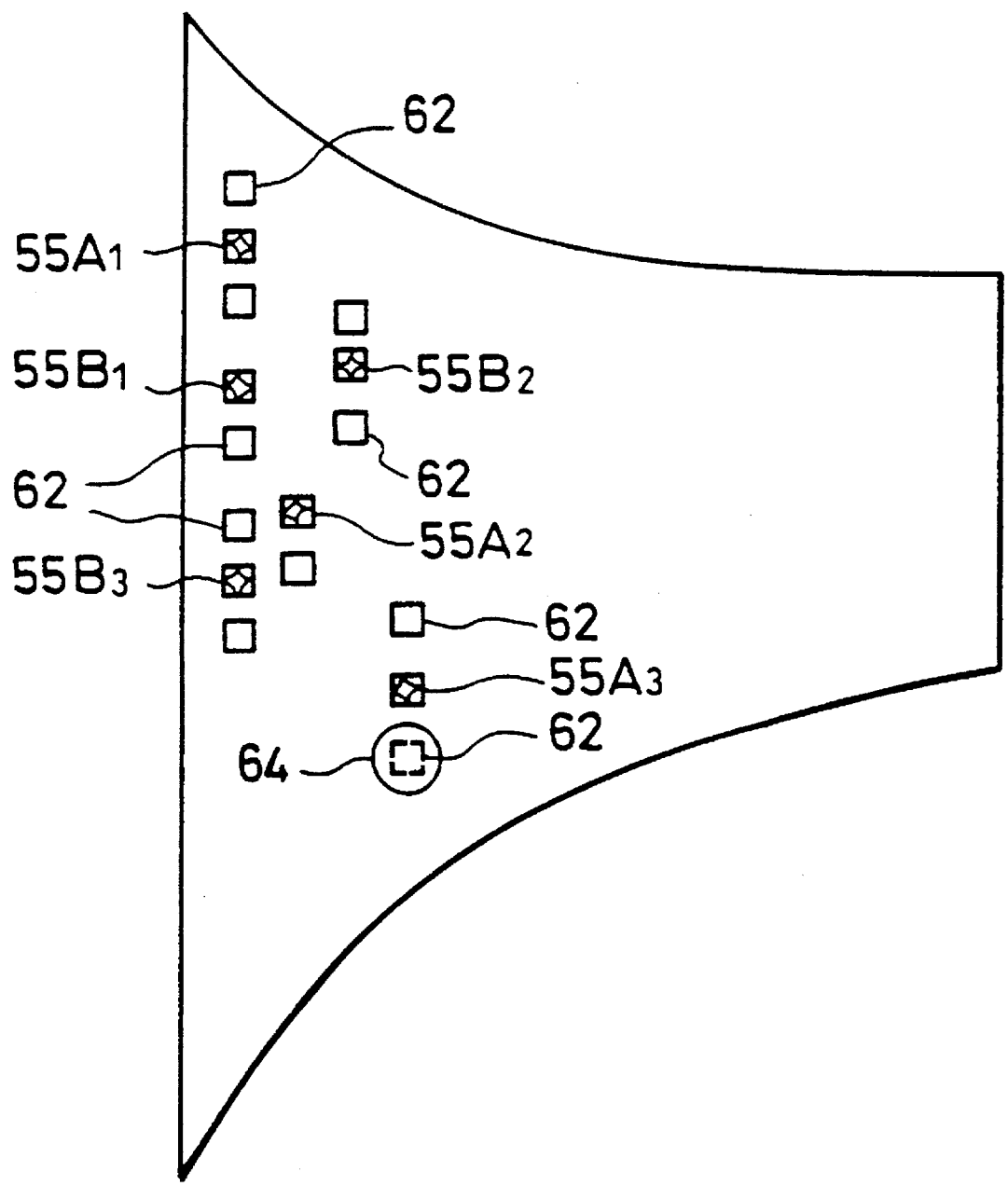
FIG. 5 is a diagram showing the arrangement of semiconductor photodiodes in the focal plane of the two-dimensional dispersion spectrum.

FIG. 5 diagrammatically illustrates the position of spectral lines in the spectrum of the focal plane 48. For the sake of clearness the figure only shows spectral lines for two elements designated by "A" and "B". A detector carrier 54 is arranged in the focal plane. The detector carrier has seated thereon semiconductor photodetectors 55 respectively at the place of an associated spectral line. As becomes apparent from FIG. 5, a respective semiconductor photodetector 55 is arranged at the location of several spectral lines of each element. Semiconductor photodetectors 55 $A_1$, 55 $A_2$ and 55 $A_3$ are seated at the locations of the spectral lines $A_1$, $A_2$ and $A_3$, respectively, of element A. Likewise, semiconductor photodetectors 55 $B_1$, 55 $B_2$ and 55 $B_3$ are seated at the locations of spectral lines $B_1$, $B_2$ and $B_3$, respectively, of element B. The spectral line $A_1$ is the main line of element A and enjoys maximum intensity in comparison with the intensities of the other spectral lines of element A. The second spectral line $A_2$ has an intensity which is a few orders smaller than the intensity of main line $A_1$. Finally, the third spectral line $A_3$ is even considerably weaker than the second spectral line $A_2$. The conditions for the spectral lines of the element B are identical. Detectors are not arranged at the locations of the spectral lines 62 for the reason that these lines are, for instance, not needed for the determination of the element. Such free lines, but also other lines, could nevertheless be used and measured, for instance, for determining the furnace temperature. The semiconductor photodetectors are preferably of a width of 0.2 mm in the direction of dispersion; semiconductor photodiodes are preferably used. Narrow-band filters of a small size can be arranged in front of individual photodetectors for an improved and inexpensive selection. These have turned out to be successful especially in combination with photodetectors that measure the furnace temperature, and especially at high furnace emissions. FIG. 5 shows such a narrow-band filter 64 in the form of a small circular disc which is arranged at the location of a spectral line 62. The semiconductor photodetectors 55 are connected to an evaluation circuit which is designated in FIG. 4 as block 56. The lines to be analyzed are, however, not only selected according to the level of their intensity, but mostly according to the level of their absorption sensitivity. The dynamic range can considerably be enlarged through a suitable selection. The measurements may optionally be considerably improved by performing measurements at the same line in different orders with the aid of different photodetectors. Preferably, the apparatus is first fixedly set such that the respective spectral lines of the individual elements A, B are each positioned at the same location in the focal plane 48. The photodetectors provided for the measurement of a corresponding spectral line are also provided at these locations.

In accordance with a preferred embodiment, 60 semiconductor photodetectors are provided for permitting the separate measurement of 58 spectral lines, with measurements being possibly performed on a line in separate orders at the same time.

Said 58 spectral lines are spectral lines mostly used for analyzing standard elements. The apparatus, however, is given a considerably greater measuring range by holding the camera mirror in such a manner that it is pivotable about two crossing axes 57, 58. To this end adjusting and angle measuring means 60, 61, which are just shown diagrammatically, are provided on the corresponding axes for permitting a controlled adjustment of the camera mirror by a predetermined angle. This makes it possible to displace the spectral lines in the focal plane 48 and thereby to move spectral lines to the locations of the semiconductor photodetectors which are not included in the original 58 spectral lines. The adjusting and angle measuring means 60, 61 can be controlled by a microprocessor. The basic positions of the camera mirror 47 and the adjustement coordinates are stored in an associated computer or can be calculated in case of need so as to adjust the camera mirror 57 in a specific manner such that predetermined stored spectral lines come to rest on predetermined semiconductor photodetectors.

Since, instead of photomultipliers, semiconductor photodetectors are used according to the present invention, which in the most advantageous case have a quantum yield of 20% at their maximum sensitivity of about 350 nm, a quantum yield of up to 70% can now be achieved, such a high quantum yield being also achieved down to low wavelengths, such as 200 nm, which are of main interest to the analysis.

The achievable accuracy of a measurement depends directly on the possible light throughput of the atomic absorption spectrometer. If one makes the demand that the smallest spectral slit width should be 0.2 nm, which is common in practice, this will have the effect in a typical conventional monochromator that the geometrical slit width must not exceed 0.125 mm (in the case of practical focal lengths). A very high dispersion which is about 16 times that of a normal monochromator is achieved because of the polychromator used according to the invention in the form of the echelle grating in combination with the dispersion prism. This has the consequence that the geometrical slit width can be increased to 2 mm to achieve the required spectral slit width after all. The possible advantage which can be achieved thereby and regards a considerable increase in light throughput can however not be exploited in cases where the slit height of the entrance slit is chosen such that the columns 150 to 155 of spectral lines from the smallest to the largest wavelengths as shown in FIG. 6 are at a respective distance, i.e. they do not overlap. The invention now operates with such an adjustment of the height of the entrance slit that only the columns of spectral lines according to FIG. 6 do not overlap at a shorter wavelength, i.e. columns 150 and 151, while such an overlap is deliberately accepted in the orders of the larger wavelengths, i.e., columns 154, 155. The increase in slit height by the factor 5 as can here be achieved results altogether in an increase in light throughput by a factor 5 as compared with a classical monochromator. It should already be noted here that the number of the spectral lines in atomic absorption spectrometry is small in comparison with the number of the spectral lines in atomic emission spectrometry. When only one element is analyzed, the number of lines is relatively small. Of course, the number of lines will increase with the number of the elements to be determined. When looking at FIG. 6 in this connection, one will notice that in all of the adjacent columns of spectral lines the constellations are such that upon a lateral expansion of the columns in such a manner that the columns respectively overlap each other, this will nevertheless not lead to a direct overlap with another spectral line in the adjoining column of spectral lines for many spectral lines. This finding according to the invention, which will be explained further below, will be skillfully exploited for performing measurements, in particular, of individual elements in which no overlaps of the spectral lines occur, at a considerably improved accuracy.

The structure of the evaluation circuit 56 of FIG. 4 is diagrammatically illustrated in FIG. 15. First of all, semiconductor photodetectors are arranged in the focal plane 48 at predetermined locations corresponding to the locations at which spectral lines of elements to be determined come to rest during standard operation of the apparatus. The photodetectors consist preferably of semiconductor photodiodes. In the illustrated embodiment, 60 semiconductor photodiodes of this type are shown. Each of the semiconductor photodiodes is connected to a charge amplifier with a predetermined charging capacity. The 60 charge amplifiers form 60 parallel inputs or incoming detector channels which are generally designated in FIG. 15 by the block diagram 70. 8 parallel channels 71–78 which are designated as CH1 to CH8 are, however, provided for the simultaneous measurement. Measurements can be performed with the aid of predetermined spectral lines for each measurement in response to the element or elements to be determined. To this end, the charge amplifiers assigned to the spectral lines are connected to one of the channels 71 to 78. 16 channel multiplexers which are provided in each channel 4 and which make a selection 1 among 64 and connect the corresponding channel to the desired charge amplifier serve this purpose. Such a 1 out of 64 multiplexer is arranged in each of channels 71 to 78 and establishes a fixed connection for the measurement, so that all of the 8 channels can also be operated at the same time.

The 1 out of 64 multiplexer which is provided in each channel and of which only multiplexer 81 is shown in channel 71 (CH1), since the other channels are of the same configuration, has arranged in series therewith a respective switching means 91 for digitally controlling offset and gain. The analog signals obtained at the output of said unit are then converted into a 14 bit A/D converter 101 into digital signals which are supplied via line 110 to a microprocessor 111 which all of channels 71 to 78 have in common. The microprocessor processes the signals obtained and simultaneously controls the respective multiplexer 81, the switching arrangement for the digital control of the offset and the gain 91 and the A/D converter 101, respectively, separately in each of the channels via lines 112, 113, and 114, respectively.

The signal to noise ratio is considerably improved in comparison with the time serial scanning of the individual detector channels owing to the possibility of performing all measurements via said 8 channels 71 to 78 at the same time.

The respectively preferred measurement method shall now be described in the following with reference to FIGS. 7 to 14 for achieving a further optimization in the measurement in general and in the measurement of one or a few elements, in particular, in comparison with the determination of a plurality of elements.

FIG. 7 illustrates the coordinated time sequences of the magnetic field 8 in FIG. 1 under a), the on-off state of a lamp under b), the output signal of a charge amplifier under c) and the time sequence of reset signals in combination with the time sequence of the respective A/D conversion under d). Curve a) shows a cycle of the magnetic field. This cycle consists in a first rise of the magnetic field in a period of 3 msec. This is followed by a phase of a constant magnetic field of about 6 msec. This, in turn, is followed by a decrease in the magnetic field in that said field is switched off within a period of 3 msec. This is followed by a phase of 6 msec in which the magnetic field is switched off, i.e., there is no magnetic field.

On the basis of the measurements with turned-on and turned-off magnetic field, absorption measurements can be improved in the known manner by exploiting the Zeeman effect. In the periods during which the magnetic field is changing, the lamp remains switched off and a change in voltage due to the dark current is just measured at the output of the charge amplifier in these periods. The lamp (under b)) is normally switched on during the whole period in which the magnetic field is in a constant state, i.e., between the time from 3 to 9 and from 12 to 18 msec. The output signal at the charge amplifier under c) shows a corresponding rise of the signal with time. The output of the charge amplifier is reset by a reset pulse according to the illustration d) at times 0, 3, 9, 12 and 18 msec, respectively, i.e. when a new phase of the magnetic field adjustment is started. The measurement is performed in that a first A/D conversion is performed approximately in the period of a constant magnetic field between 3 and 9 msec after the reset pulse II at the time of arrow 3 and a second conversion is preformed at the end of the exposure phase prior to the application of the reset pulse III, namely at the time of arrow 4. The difference between the two measurements is evaluated as a signal.

As is known, the intensities of the individual spectral lines are very different. The dynamic range is improved according to the invention by two measures. Since a charge amplifier is assigned to each spectral line taken into account for a measurement, the measuring characteristics especially depend on the charging capacity used for the charge amplifiers. If charging capacities of a low capacity are used, this will lead to a sensitive response having, however, the disadvantage that such a charge amplifier will very rapidly reach the saturation region. By contrast, the use of a greater capacity has the disadvantage that the response characteristics of the charge amplifier become insensitive on the one hand and that it might happen that the saturation state is not reached on the other hand. In accordance with the invention a different capacity which may be within the range of about 1 to 10 pF is assigned to each charge amplifier in response to the intensity of the associated spectral line as is to be expected. The assignment is preferably such that, in combination with spectral lines of minimum intensity, a capacity of about 1 pF is assigned and, with those of maximum intensity to be expected, a capacity of about 10 pF is assigned and corresponding values between the maximum and minimum capacity values are assigned to the other spectral lines. Furthermore, in accordance with an additional measure according to the selection of the spectral lines of the analyte elements as made by the computer and of the charge amplifiers assigned to the spectral lines, which according to FIG. 15 are then connected to the fixed channels 71 to 78, a measurement of the magnitude of the signals to be respectively expected is then performed in a first set-up step. This means that the charges to be expected on the charge amplifiers are roughly estimated. Should it turn out that one of the charge amplifiers might reach the saturation region due to the measurement signal to be expected, a measuring mode will be set by the microprocessor in such a manner that the output of the charge amplifier is not sampled as late as the end of the illumination phase, for instance at the time of arrow 4 under d) in FIG. 7, but repeated sampling is performed as shown in FIG. 14. In response to the magnitude of the signal to be expected, the output signals may be sampled two times or four times or even eight times by dividing for instance the time interval during which the lamp is in the on state, into measuring time intervals of ½, ¼ or ⅛ of the lamp on period. The time sequences are illustrated in FIG. 14 in the same manner as in FIG. 7. The illustration under c) shows a repeated sampling, namely in the present example in the form of a sampling of the output signal of the charge amplifier for four times during a lamp on period. Resetting by the reset pulses VI, VII and VIII is performed between the reset pulses II and III, which are already shown in FIG. 7, with an A/D conversion of the reset signal being respectively performed after or before the occurrence of the leading reset signal or the trailing reset signal, respectively, namely at the times of arrows 3, 4, 5, 7, 7, 8, 9 and 10. The total signal is then composed of an addition of the respective differences between the signals at the time of arrows 4–3, 6–5, 8–7 and 10–9. The dynamic range can considerably be extended by at least a factor 4 through said selection of the magnitude of the capacities of the charge amplifiers on the one hand and the optionally repeated measurement in the lamp on state.

As explained with reference to FIG. 6 and the position of the spectral lines in the individual orders, the height of the entrance slit is preferably increased for increasing the light throughput to such an extent that there will just not be an overlap between the orders at small wavelengths. Should in such a case overlaps arise in individual spectral lines due to different lamps when several elements are determined using several lamps, the measurement method is preferably performed such that the lamps whose spectral lines result in an overlap are operated in pulsed fashion in temporally separated periods. The switch-on phases of the lamps, however, may also overlap. In particular, the switch-on phases may extend up into the "dark phases", i.e. the time segments with changing magnetic field, depending on the requirements of the lamp operating conditions and/or the composition of the noise. FIGS. 8 and 9 show the time sequences in accordance with FIG. 7. FIG. 8 illustrates the operation of a first lamp and FIG. 9 the corresponding time sequence for the operation of a second lamp. The time diagrams of FIG. 9 have been designated by e) to h) just to distinguish them from the time diagrams of FIG. 8, but they correspond to the time sequences of FIG. 7. As follows from the time diagram of b) and f), the on times of the two lamps are offset relative to each other and respectively reduced to half the time interval during which the magnetic field is in a constant state. The illustrations c) and g) show the corresponding output signals at the charge amplifier. The lamp parameters such as intensities and on phases are adjusted through an intelligent automatic adjustment performed by the controlling computer 11 in FIG. 1. The calculation is carried out on the basis of stored, classified data, such as the values of overlapping spectral lines which, however, are to be measured at the same time.

The corresponding time diagrams are illustrated in FIGS. 10 to 13 for the case that four lamps are respectively operated in pulse operation and at times differing from those of the corresponding other lamps. The temporally offset switch-on times of the four lamps are respectively shown in the illustrations e), f), j) and n). The on times of the lamps are each reduced to one ¼ of the period in which the magnetic field is in a constant state. The time diagrams c), g), k) and o) each show the corresponding output signals on the charge amplifiers. The overlapping spectral lines can also be measured in an exact manner on account of the pulse operation of the lamps in periods separated in time.

When the switching times of the lamps are reduced, the signal to noise ratio is normally decreased. For instance, when the lamp on time is reduced to half, such a decrease is between a factor of +e,fra 1/√2+ee and ½. However, when lamps without electrodes are used, i.e., high-frequency induction lamps, this has the essential advantage that these can be operated with higher pulse powers at short on times without the line characteristics of the spectral lines being adversely affected thereby. The signal to noise ratio can be kept constant and even at shorter switching times of the lamp by using such lamps, since the product of intensity and measuring time remains constant, i.e., if a lamp is used which is operated with double intensity at half the measurement time.

The measurement can further be optimized according to the invention in that suitable corrections are made with respect to a change in the measurement caused by dark current and emission of the furnace and by a change in the zero line. This is achieved through correlated multiple scanning. This method shall first be explained with reference to FIG. 7 and then be carried out. The periods during which the magnetic field builds up to full strength (in the range from 0 to 3 msec) and abates to zero (9 to 12 msec) are used for the measurement of dark current and the emission from the furnace. The lamps are turned on only during the intervals in which the magnetic field is at full strength (3–9 msec) and at zero (12–18). Illustration c) shows the output voltage of the charge amplifier for the measurement channel corresponding to the lamp in illustration b). The slope of the output voltage ramp is low during the dark periods and proportional to lamp intensity during the lamp on periods. The measurement cycle is divided into integration intervals by a series of reset pulses. These reset pulses and the analog to digital (A/D) conversions are shown in trace d). One (or up to four) A/D conversions are made at each point marked with an arrow. Conversion 1 is made shortly after the reset pulse for the foregoing magnet off measurement and conversion 2 immediately before the reset pulse II for the dark measurement. The difference between conversions 1 and 2 gives the offset corrected value for intensity in the absence of illumination by the lamp. Analogously, the difference between conversions 3 and 4 gives the intensity of the lamp in addition to dark current and furnace emission with the magnetic field at full strength. The difference between conversions 5 and 6 corresponds to dark current and furnace emission intensity a half cycle after conversions 1 and 2. Finally the difference between conversions 7 and 8 is proportional to lamp intensity in addition to dark current and furnace emission with the magnetic field off. The net intensity of the lamp in the presence and absence of the magnetic field is calculated for each measurement cycle (j=1 to n, where n is the number of cycles) by subtracting the sum of the two values for the dark state, which values temporally bracket the respective measurement period, from the respective lamp-on value. The following two intensity measurements are consequently obtained for the cycle illustrated in FIG. 7:

$$I(j)(\text{magnet on}) = (AD4(j) - AD3(j)) - (AD2(j) - AD1(j)) - (AD6(j) - AD5(j))$$

$$I(j)(\text{magnet off}) = (AD8(j) - AD7(j)) - (AD6(j) - AD5(j)) - (AD2(j+1) - AD1(j+1))$$

This mode of measurement regards the standard situation, and the timing for each of up to four lamps and for each of up to eight measurement channels is identical.

In the case of spectral overlap, the timing of the lamps and measurement channels is altered so that the individual lamp intensities can be measured independently. The timing illustrated in FIGS. 8 and 9 can for instance be used when there is for instance an overlap of the arsenic 228.812 nm spectral line on the cadmium resonance line with wavelength 228.802 nm. This example shall be discussed later with reference to FIG. 16. The timing of the magnetic field is identical in the two figures (traces a and e). As already explained, the two lamps are turned on separately, each for one half of each phase in which the magnetic field is constant. The dark measurements for both channels are the same. As can be seen in traces d and h, reset pulses have been provided in addition to the reset pulses I to IV, as shown in FIG. 7, so that the differences between A/D conversions 3 and 4 and 7 and 8 for the two channels correspond to the intensities of the respective lamps of interest. Since the intervals for the measurements with lamp on are reduced in length, the measured values are adjusted before correction for dark current and furnace emission. By analogy with the explanations with respect to FIG. 7, the following intensities are obtained as the corrected measurement signals:

$$I(j)(\text{magnet on}) = (AD4(j) - AD3(j)) * 2 - (AD2(j) - AD1(j)) - (AD6(j) - AD5(j))$$

$$I(j)(\text{magnet off}) = (AD8(j) - AD7(j)) * 2 - (AD6(j) - AD5(j)) - (AD2(j+1) - AD1(j+1))$$

The corresponding corrected measurement signals and corresponding intensities follow in a similar manner from the measurement signals in the pulsed separated operation of four lamps, as explained with reference to FIGS. 10 to 14.

If a measuring mode with multiple scanning is performed as in FIG. 4, one will obtain the following net lamp intensities:

$$I(j)(\text{magnet on}) = (AD4(j) - AD3(j)) + (AD6(j) - AD5(j)) + (AD8(j) - AD7(j)) + (AD10(j) - AD9(j)) - (AD2(j) - AD1(j)) - (AD12(j) - AD11(j))$$

$$I(j)(\text{magnet off}) = (AD14(j) - AD13(j)) + (AD16(j) - AD15(j)) + (AD18(j) - AD17(j)) + (AD20(j) - AD19(j)) - AD12(j) - AD11(j)) - (AD2(j+1) - AD1(j+1))$$

The measurement method shall once again be explained with reference to FIG. 16 for the case that there are two overlapping spectral lines, which is the case when elements As and Cd are simultaneously determined side by side. As for the arsenic determination, such an element combination is not very troublesome, it can be carried out at 193.7 nm without problem. By contrast, cadmium which is measured at the Cd spectral line 228.802 nm (resonance line of the Cd spectrum) presents a different situation. The Cd line is extremely overlapped by another line of the As spectrum at 228.812 nm which is hardly absorbed by the As atoms existing in the sample. The two spectral lines are spectrally in such a close vicinity ($\Delta\lambda$ only 0.01 nm) that they can no longer be separated for atomic absorption. A spectral apparatus which would sufficiently separate the two lines would necessarily have such a small light throughput that a reasonable atomic absorption analysis would no longer be possible. FIG. 16 shows six illustrations 16a to 16f, with illustrations 16a, 16c and 16e showing the measurements on channel CH1 for the arsenic line 193.7 nm and illustrations 16b, 16d, 16f the measurements on channel CH2 for the cadmium line 228.802 nm. All illustrations show absorbance plotted against time.

Illustrations 16a and 16b show the simultaneous measurement on the two channels, with the lamp for the element arsenic being however covered. Illustrations 16c and 16d also show the simultaneous measurement on the two channels 1 and 2, both the lamp for the element arsenic and the lamp for the element cadmium radiating at the same time. Illustrations 16e and 16f show a measurement in which, as shown in FIGS. 8 and 9, the lamps for arsenic and for cadmium are pulsed in temporally separated manner.

Since the As lamp is switched off in illustration 16A, the figure just shows the dark noise of the measurement channel (detector noise, amplifier noise). By contrast, measurement curve 16b illustrates the time sequence of the optical absorbance to which the cadmium spectral line is subjected by the cadmium atoms which are present in the optical path during the atomizing phase.

When, in accordance with the illustrations 16c and 16d, the As lamp is switched on together with the cadmium lamp and when the attempt is made to determine the elements As and Cd side by side, the same appearance as in an isolated As determination is obtained for the absorbance for As according to illustration 16c. By contrast, there is a change in the measurement curve for cadmium in the case of which considerably lower absorbance values are now obtained with the same sample. The reason for this is the spectral overlap of the Cd line 228.802 nm by the As line 228.812 nm which is simultaneously detected by the detector.

Illustrations 16e and 16f then show the absorbance curves which are obtained when the As lamp and the Cd lamp are operated separately. The same absorbance curve as in FIG. 16b can now be seen in FIG. 16f for cadmium, i.e. when the element cadmium is determined alone.

We claim:

1. A multielement atomic absorption spectrometer (1) comprising at least two lamps (20, 21; 30, 31) respectively emitting lines of at least one analyte element, a furnace (5) for heating the analyte sample into its atomized state, at least one optical dispersion element (9) having an entrance slit (41, 42) arranged upstream thereof, detector elements (55) means (4; 43, 47) for passing the radiation emanating from said lamps through said furnace, through said entrance slit and said dispersion element to said detector elements, and measuring means (10, 11; 6), characterized in that a rectangular prism (39), a roof prism (38) and a four-edged prism (27) are selectively movable into the optical path of said lamps in such a manner that the radiation emanating from one, two or four lamps can be passed through said furnace at the same time, that said dispersion element for producing a two-dimensional dispersion spectrum comprises an echelle grating (46) and a dispersion prism (44), and that said detector elements are formed by semiconductor photodiodes arranged in one plane.

2. The apparatus according to claim 1 characterized in that a solenoid is provided for generating a magnetic field (8) in said furnace (5).

3. The apparatus according to claim 1, characterized in that said prisms are arranged on a common mounting (33) which is adjustable relative to said lamps.

4. The apparatus according to claim 1, characterized in that said lamps are mounted on rotatable mounting means (2).

5. The apparatus according to claim 1, characterized in that there are provided at least two sets each having up to four lamps respectively held on a common mounting (2), and that means (2, 3) are provided for selectively positioning a respective set of lamps in an operative position.

6. The apparatus according to claim 1, characterized in that lamps are respectively provided with a code which is associated with a lamp and indicative of the element(s) contained in a lamp.

7. The apparatus according to claim 1 characterized in that each detector element (55) has assigned thereto, in response to its position in a two-dimensional semiconductor photodiode assembly (54), a predetermined wavelength ($A_1$, $A_2$, $A_3$; $B_1$, $B_2$, $B_3$) of a predetermined order and that, in response to the relative differences to be expected in the intensities and absorption sensitivities of said wavelengths, the magnitudes of the charging capacities assigned to said semiconductor photodiodes are selected accordingly within a range of variation of about 1:10, that the lowest intensity or atomic absorption sensitivity is approximately assigned to the lowest capacity and the highest intensity or atomic absorption sensitivity to about the highest capacity.

8. The apparatus according to claim 7, characterized in that the charging capacities are selected in the range of from 1 to 10 pF.

9. The apparatus according to claim 8, characterized in that there is provided a mirror (47) for imaging the beams from the echelle grating onto said two-dimensional semiconductor photodiode assembly, and that said mirror is rotatable about two crossing axes (57, 58) for displacing the projection of a predetermined spectral line onto the area of a predetermined semiconductor photodiode.

10. The apparatus according to claim 9, characterized in that apparatuses (60, 61) are provided for automatically scanning and adjusting the angle for a rotation of said mirror (47) about a respective one of said axes (57, 58).

11. The apparatus according to claim 10, characterized in that the adjustment of said mirror is controllable via a computer (11) in which the position of selected spectral lines on said two-dimensional semiconductor photodiode assembly (54) is stored or can be calculated.

12. The apparatus according to claim 1, characterized in that there are provided parallel measurement lines (CH1 to CH8) whose number is smaller than the number of said semiconductor photodiodes and which respectively communicate with one or a common measurement data memory (11) and that an electronic switching means (81 to 88) is provided for connecting said measurement lines to a respectively selected semiconductor photodiode.

13. The apparatus according to claim 12, characterized in that a microprocessor (111) is provided for controlling said electronic switching means (81 to 88) in response to selected elements to be measured in such a manner that said measurement lines are connected to predetermined semiconductor photodiodes.

14. The apparatus according to claim 12, characterized in that the number of said measurement lines (CH1 to CH8) is 8.

15. The apparatus according to claim 12, characterized in that each of said measurement lines (CH1 to CH8) is connected via an amplifiers (91 to 98) and A/D converters (101 to 108) to said measurement data memory (memories) and/or a microprocessor (111).

16. The apparatus according to claim 15, characterized in that said amplifiers (91 to 98) are controllable via said microprocessor (111) digitally with respect to offset and gain.

17. The apparatus according to claim 15, characterized in that each of said A/D converters (101 to 108) is an A/D converter with at least 14 bits.

18. The apparatus according to claim 1, characterized in that at least one semiconductor photodiode is provided for determining the temperature of said furnace from the received radiation.

19. The apparatus according to claim 1, characterized in that said semiconductor photodiodes have a width of about 0.2 mm in the direction of dispersion.

20. The apparatus according to claim 1, characterized in that a narrow-band filter (64) is arranged in front of at least one of said semiconductor photodiodes.

21. Measurement method using an atomic absorption spectrometer according to claim 2, characterized in that a magnetic field which rises, which is then kept constant, which abates and is subsequently kept constant at zero is produced on said sample cyclically during predetermined periods, that said lamp(s) is/are operated intermittently such that the on phases thereof are substantially within the periods of said constant or switched-off magnetic field, that the height of said entrance slit is adjusted such that the short wavelength lines do not overlap in the orders, that it is determined prior to a measurement whether the spectral lines intended for the measurement of the elements to be measured overlap, and that in response to the absence or presence of an overlap the lamps are operated continuously or offset in time with possibly temporal overlaps during the periods of said constant magnetic field and said switched-off magnetic field.

22. In a multielement atomic absorption spectrometer having at least two lamps respectively emitting lines of at least one analyte element, a furnace for heating the analyte sample into its atomized state, at least one optical dispersion element having an entrance slit arranged upstream thereof, detector elements, means for passing the radiation emanating from said lamps through said furnace, through said entrance slit and said dispersion element to said detector elements, and measuring means, a rectangular prism, a roof prism and a four-edged prism selectively movable into the optical path of said lamps in such a manner that the radiation emanating from one, two or four lamps can be passed through said furnace at the same time, said dispersion element for producing a two-dimensional dispersion spectrum comprising an echelle grating and a dispersion prism, and said detector elements being formed by semiconductor photodiodes arranged in one plane;

a measurement method comprising the steps of:

moving said rectangular prism into the optical path of said lamps when one lamp is emitting radiation or moving said roof prism into the optical path of said lamps when two lamps are emitting radiation or moving said four-edged prism into the optical path of said lamps when four lamps are emitting radiation, generating a magnetic field in said furnace which rises for a first period of time, which is constant for a second period of time, which abates for a third period of time and which is constant at zero for a fourth period of time, intermittently operating said lamp or lamps respectively during the periods of a constant magnetic field, adjusting a height of the entrance slit so that short wavelength lines do not overlap in orders, determining prior to a measurement whether spectral lines intended for the measurement of elements to be measured overlap, and operating said lamps continuously or offset in time in response to the absence or presence of an overlap with possible temporal overlaps during the periods of said constant magnetic field and said switch-off magnetic field.

23. The measurement method according to claim 22, characterized in that in the presence of an overlap of spectral lines said lamps are respectively operated individually and in temporally separated fashion.

24. The measurement method according to claim 22, with each of said semiconductor photodiodes having assigned thereto a predetermined charge amplifier, characterized in that selected semiconductor photodiodes are switched into measuring readiness in response to the analyte element (s), that it is determined in a set-up step in the on state of said lamps whether and to what extent each of said charge amplifiers passes into a saturation region during a lamp on period provided for the operation of each of said lamps, and that, when said saturation region of a charge amplifier is exceeded, scanning and measurement which are normally performed at the end of a lamp on period are performed at shorter time intervals with subsequent resetting after such respective shorter time intervals in such a manner in response to the measured strengths of the charge that in each shorter time interval said saturation region will never be reached.

25. The measurement method according to claim 24, characterized in that said shorter time intervals are chosen to be ½ or ¼ of the length of said lamp on period.

26. The measurement method according to claim 22, with each of said semiconductor photodiodes having assigned thereto a predetermined charge amplifier, characterized in that at the beginning and the end, respectively, of a period within which said magnetic field changes, a reset signal is applied to each of said charge amplifiers of said semiconductor photodiodes selected for measuring one or a plurality of said elements, that in every period with a constant magnetic field the respective output signal is read on each charge amplifier at the beginning and at the end of the duration of the radiation impinging on the associated semiconductor photodiode, and that the difference is formed therefrom, that in the period which precedes or follows said period with constant magnetic field and which has a changing magnetic field, the output signal of said charge amplifier is respectively measured after the reset signal at the beginning and before the reset signal at the end of each of said periods, the difference is formed for each period from the trailing and leading measuring signal, and that these two difference values are subtracted from the value of the difference of the signals during radiation and a corrected reading signal is formed thereby.

27. The measurement method according to claim 26, characterized in that during a measurement in which the output signal of said charge amplifier is repeatedly measured for the duration of the radiation impinging on the associated semiconductor photodiodes and is respectively reset by a subsequent reset signal, the difference of said output signals is first formed prior to the supply of the subsequent reset signal and of the output signal measured after the leading reset signal, the difference values are added and the sum of said difference values is set as the value of the difference of the signals obtained during radiation.

28. The measurement method according to claim 26, characterized in that during a measurement in which the duration of the radiation impinging on a semiconductor photodiode is just a fraction 1:n of the period of a constant magnetic field on account of the pulsed operation of the lamps, the value of the difference of said signals during radiation is multiplied by the factor n.

* * * * *